United States Patent
Dawson et al.

(10) Patent No.: US 10,252,160 B2
(45) Date of Patent: *Apr. 9, 2019

(54) SYSTEM FOR PERSONALIZING CONTENT PRESENTED IN AN AVATAR WAIT STATE

(71) Applicant: International Business Machines Corporation, Armonk, NY (US)

(72) Inventors: Christopher James Dawson, Arlington, VA (US); Rick Allen Hamilton, II, Charlottesville, VA (US); Clifford Alan Pickover, Yorktown Heights, NY (US); Anne R. Sand, Peyton, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/846,834

(22) Filed: Dec. 19, 2017

(65) Prior Publication Data

US 2018/0104585 A1  Apr. 19, 2018

Related U.S. Application Data

(63) Continuation of application No. 11/924,743, filed on Oct. 26, 2007, now Pat. No. 9,908,046.

(51) Int. Cl.
  *A63F 13/45* (2014.01)
  *A63F 13/79* (2014.01)
  (Continued)

(52) U.S. Cl.
  CPC .............. *A63F 13/45* (2014.09); *A63F 13/12* (2013.01); *A63F 13/79* (2014.09); *A63F 13/88* (2014.09);
  (Continued)

(58) Field of Classification Search
  CPC .......... A63F 13/45; A63F 13/79; A63F 13/88; A63F 13/12
  See application file for complete search history.

(56) References Cited

U.S. PATENT DOCUMENTS

| | | |
|---|---|---|
| 5,718,632 A | 2/1998 | Hayashi |
| 5,768,122 A | 6/1998 | Motoc |

(Continued)

OTHER PUBLICATIONS

USPTO; first Office Action dated Nov. 10, 2010 in related U.S. Appl. No. 11/924,743.

(Continued)

*Primary Examiner* — Robert T. Clarke, Jr.
*Assistant Examiner* — Thomas H Henry
(74) *Attorney, Agent, or Firm* — Robert H. Frantz; Maeve M. Carpenter

(57) ABSTRACT

Customized wait state experiences for an avatar in a virtual universe are provided by determining user alternative wait context preferences, selecting alternative wait state content objects accordingly, creating a wait state context in the virtual universe system using the alternative wait state content objects, and transporting the waiting avatar to the newly created wait state context for the duration of the wait. The custom context can include scenery, sounds, and even information streams and feeds. The avatar is optionally returned to the original context upon an event, such as a customer service representative, being available and ready to interact with the user. Artificial intelligence processes are optionally used to determine probable wait state context preferences for the user. Rewards may be given to the user for waiting, and for completing games or challenges.

18 Claims, 15 Drawing Sheets

(51) Int. Cl.
A63F 13/88 (2014.01)
A63F 13/30 (2014.01)
(52) U.S. Cl.
CPC ............... *A63F 2300/5553* (2013.01); *A63F 2300/5593* (2013.01); *A63F 2300/6036* (2013.01); *A63F 2300/636* (2013.01)

(56) References Cited

U.S. PATENT DOCUMENTS

| | | | | |
|---|---|---|---|---|
| 5,848,396 | A | * | 12/1998 | Gerace ............... G06Q 30/02 705/7.33 |
| 5,880,731 | A | | 3/1999 | Liles et al. |
| 6,271,843 | B1 | | 8/2001 | Lection et al. |
| 6,608,636 | B1 | * | 8/2003 | Roseman ............... G09B 5/14 348/E7.083 |
| 6,772,195 | B1 | | 8/2004 | Hatlelid et al. |
| 6,774,885 | B1 | | 8/2004 | Even-Zohar |
| 7,225,464 | B2 | | 5/2007 | Satyavolu et al. |
| 2001/0029506 | A1 | | 10/2001 | Lee et al. |
| 2002/0113820 | A1 | | 8/2002 | Robinson et al. |
| 2003/0156134 | A1 | | 8/2003 | Kim |
| 2005/0266925 | A1 | | 12/2005 | Hornell et al. |
| 2007/0118420 | A1 | | 5/2007 | Jung et al. |
| 2007/0130001 | A1 | | 6/2007 | Jung et al. |
| 2009/0124349 | A1 | | 5/2009 | Dawson et al. |

OTHER PUBLICATIONS

IBM; reply submitted on Jan. 20, 2010 to first Office Action in related U.S. Appl. No. 11/924,743.
USPTO; second Office Action dated Apr. 27, 2011 in related U.S. Appl. No. 11/924,743.
IBM; Appeal Brief submitted on Sep. 27, 2011 to second Office Action in related U.S. Appl. No. 11/924,743.
USPTO; Examiner's Answer dated Dec. 8, 2011 in related U.S. Appl. No. 11/924,743.
IBM; Reply Brief submitted on Feb. 8, 2011 in related U.S. Appl. No. 11/924,743.
USPTO; PTAB decision mailed on Feb. 18, 2015 in related U.S. Appl. No. 11/924,743.
IBM; reply submitted on Apr. 18, 2015 to second Office Action in related U.S. Appl. No. 11/924,743.
USPTO; third Office Action dated Aug. 31, 2015 in related U.S. Appl. No. 11/924,743.
IBM; reply submitted on Nov. 30, 2015 to third Office Action in related U.S. Appl. No. 11/924,743.
USPTO; fourth Office Action dated Mar. 9, 2016 in related U.S. Appl. No. 11/924,743.
IBM; reply submitted on Jun. 9, 2016 to fourth Office Action in related U.S. Appl. No. 11/924,743.
USPTO; fifth Office Action dated Oct. 28, 2016 in related U.S. Appl. No. 11/924,743.
IBM; reply submitted on Jan. 30, 2017 to fifth Office Action in related U.S. Appl. No. 11/924,743.
USPTO; sixth Office Action dated May 18, 2017 in related U.S. Appl. No. 11/924,743.
IBM; reply submitted on Aug. 7, 2017 to sixth Office Action in related U.S. Appl. No. 11/924,743.
USPTO; Notice of Allowance dated Oct. 26, 2017 in related U.S. Appl. No. 11/924,743.
Business Week, "My Virtual Life," downloaded on Sep. 24, 2007 from http://www.businessweek.com/print/magazine/content/06_18/b3982001.htm?chan=gl.
Wikipedia, "Machine-readable," downloaded on Sep. 17, 2007 from http://en.wikipedia.org/wiki/Computer_readable.
Satterfield, Brian, "Downloading Software: An FAQ for Beginners," downloaded on Sep. 17, 2007 from http://www.techsoup.org/learningcenter/software/page7394.cfm.
Brain, Marshall, "How Boolean Logic Works," downloaded on Sep. 17, 2007 from http://www.howstuffworks.com/boolean.htm/printable.
Brain, Marshall, "How C Programming Works," downloaded on Sep. 17, 2007 from http://www.howstuffworks.com/c.htm/printable.
Tyson, Jeff, "How Computer Memory Works," downloaded on Sep. 17, 2007 from http://computer.howstuffworks.com/computer-memory.htm/printable.
Tyson, "How Internet Infrastructure Works," downloaded on Sep. 17, 2007 from http://www.howstuffworks.com/internet-infrastructure.htm/printable.
Brain, Marshall, "How Java Works," downloaded on Sep. 17, 2007 from http://www.howstuffworks.com/program.htm/printable.
Tyson, Jeff, "How PCs Work," downloaded on Sep. 17, 2007 from http://computer.howstuffworks.com/pc.htm/printable.
Wikipedia, "Machine readable medium," downloaded on Sep. 17, 2007 from http://en.wikipedia.org/wiki/Machine-readable_medium.
Braun, Mikio L., PhD; "What is the difference between statistics and machine learning?", retrieved on Jul. 20, 2011 from http://www.quora.com/Mikio-L-Braun.
Lalonde, Oliver; "What is the difference between data mining, statistics, machine learning and AI?", retrieved on Jul. 20, 2011 from http://stats.stackexchange.com/questions/5026/.
Wikipedia; "Conference Hall", retrieved on Nov. 25, 2015 from https://en.wikipedia.org/wiki/Conference_hall.
The Free Dictionary by Farlex; "Conference Room"; retrieved on Nov. 25, 2015 from http://www.thefreedictionary.com/conference+room.

* cited by examiner

SYSTEM FOR PERSONALIZING CONTENT PRESENTED IN AN AVATAR WAIT STATE

CROSS-REFERENCE TO RELATED APPLICATIONS (CLAIMING BENEFIT UNDER 35 U.S.C. 120)

This is a continuation application of U.S. patent application Ser. No. 11/924,743, filed on Oct. 26, 2007, by Christopher James Dawson, et al.

BACKGROUND OF THE INVENTION

Field of the Invention

This is a continuation application of U.S. patent application Ser. No. 11/924,743, filed on Oct. 26, 2007, by Christopher James Dawson, et al. The present invention relates generally to "Virtual World" system technologies, Massively Multiplayer Online Role Playing systems, and the like.

Background of the Invention

Whereas the determination of a publication, technology, or product as prior art relative to the present invention requires analysis of certain dates and events not disclosed herein, no statements made within this Background of the Invention shall constitute an admission by the Applicants of prior art unless the term "Prior Art" is specifically stated. Otherwise, all statements provided within this Background section are "other information" related to or useful for understanding the invention.

"Virtual Worlds", also sometimes referred to as "Massively Multi-Player Online Role Playing Games" ("MMPorg") systems, are well known in the art for their ability to allow users, or "players", to assume a virtual identity, and to interact through that identity with the system's logic as well as with other users or players through their own virtual identities. Some of the presently available Virtual World systems and products include, but are not limited to, Second Life™, MindArk PE AB's Intropia™, and Makena Technologies' There<dot>com™, where <dot> represents the period or dot character ".".

By configuring the virtual identity, a user is enabled to create a persona of his or her liking, and to interact within the virtual world and the other users, who are also represented by their own virtual avatars and identities. Most Virtual World's allow the user to select or create a three-dimensional representation of his or her virtual identity, referred to as an "avatar". Avatars can be realistic in their appearance, or can be a fantasy creature. Other characteristics, such as movement speed and restrictions, communications abilities, and interaction limitations or abilities, can be defined for a user's virtual identity.

Even though these types of virtual worlds began as gaming and role playing products, they have now evolved into useful platforms for other purposes. One such purpose is an evolution of online meetings, online conferences, online customer service, and online training or education.

Previous products directed towards these purposes were based on presenting the real voice and/or real image of each "attendee" to an online meeting, either through sharing of still photos of each attendee, or through use of webcams to transmit live images. Communications were enabled through simultaneous use of telephone lines, or through use of voice-over-Internet-Protocol ("VoIP") and/or text messaging.

These conferencing systems offer many advantages, such as saving travel costs, allowing quicker dissemination of information, and fostering near-face-to-face relationships, but one draw back of such online meetings is that there is little or no sensation of community during the online conference—each attendee still feels as if he or she is using a computer alone to converse with the other attendees.

With the evolution of Virtual World's into this manner of usage (i.e. virtual conferencing rather than virtual gaming), many of these issues are resolved because there is a greater sense of community or social interaction as the experience is much more complete and realistic. Each attendee feels much more immersed in the meeting virtual environment, including the virtual conference room or space, and each attendee has a greater sensation of the other attendees' presence because each attendee has a virtual position within the group of attendees, which cannot be had from a standard web meeting.

Further, the facilities issue is alleviated through hosting meetings, training, and conferences in Virtual World's. Rather than renting expensive meeting facilities, and providing expensive real display fixtures and furniture, a company can configure a virtual meeting in a virtual world which has all of the "appearance" factors as desired at a fraction of the costs of a corresponding real-world conference room. Even better, the virtual conference room can be reconfigured as needed, such as expanding the virtual conference room when a larger-than-expected attendee group "signs up" to attend.

Since many original virtual worlds did not restrict where players could "go" within the world, except for restrictions placed on certain levels or privileges for each player, in order to host business-to-business functions, some modifications to the virtual world systems were made.

Chief among these modifications were definitions and controls put in place to allow definition of "private virtual worlds", where one or more users could control which other users could "enter" the private virtual world. This allows a company such as International Business Machines to create multiple private virtual worlds within a virtual world system, such as SecondLife™, for the purposes of employee training, customer meetings, etc., without the concern for third-parties accessing sensitive or confidential information.

SUMMARY OF THE INVENTION

The invention provides customized wait state experiences for an avatar in a virtual universe by determining user alternative wait context preferences, selecting alternative wait state content objects accordingly, creating a wait state context in the virtual universe system using the alternative wait state content objects, and transporting the waiting avatar to the newly created wait state context for the duration of the wait. The custom context can include scenery, sounds, and even information streams and feeds. The avatar is optionally returned to the original context upon an event, such as a customer service representative, being available and ready to interact with the user. Artificial intelligence processes are optionally used to determine probable wait state context preferences for the user. Rewards may be given to the user for waiting, and for completing games or challenges.

BRIEF DESCRIPTION OF THE DRAWINGS

The following detailed description when taken in conjunction with the figures presented herein provide a complete disclosure of the invention.

DETAILED DESCRIPTION OF THE INVENTION

Figure 1A:
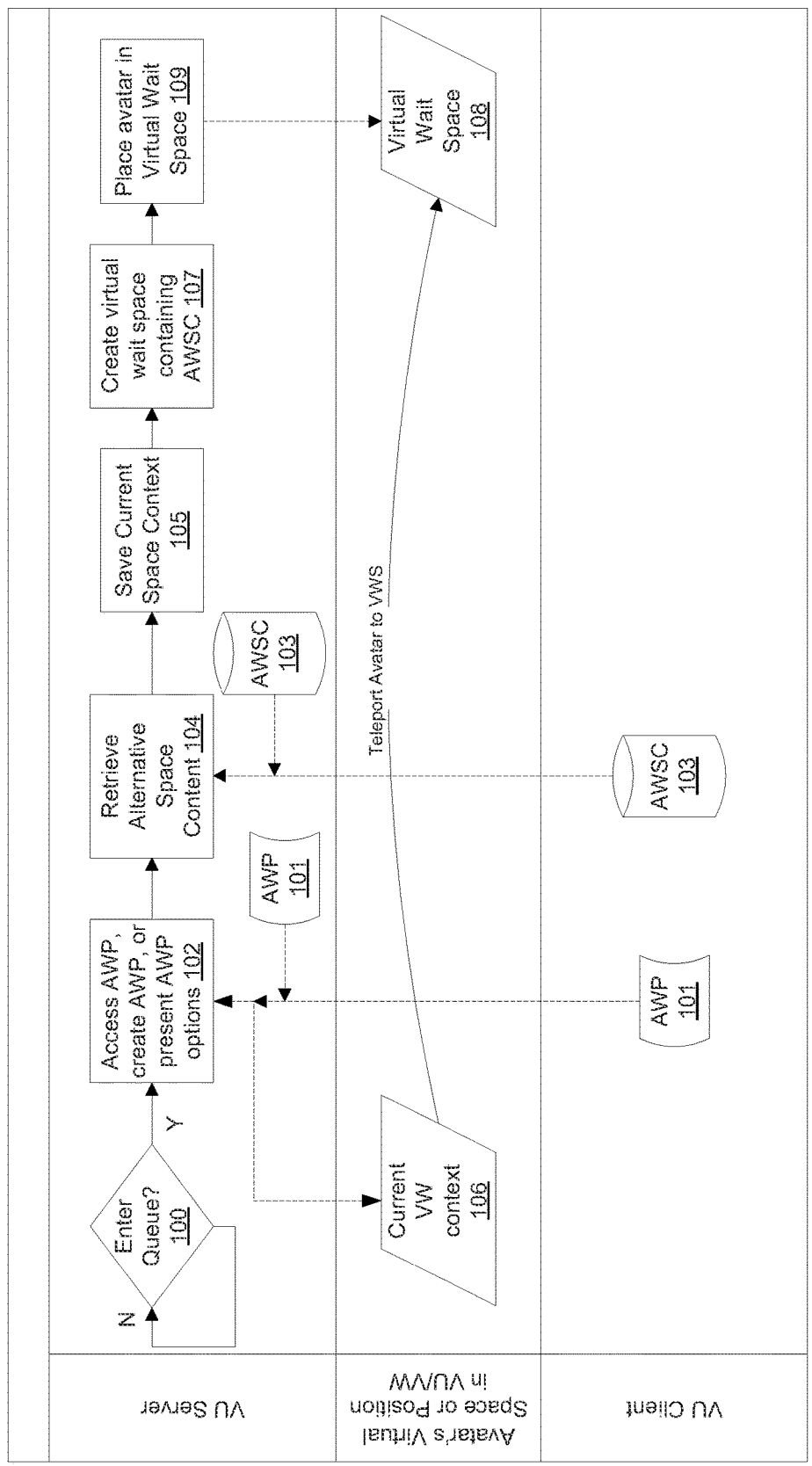
FIGS. 1a and 1b illustrate logical processes according to the invention.

The inventors of the present invention have recognized and solved problems previously unrecognized by others in the art virtual world technologies. Many retailers are opening stores within Virtual Universes and Virtual Worlds ("VUs" or "VWs"), such as SecondLife ("SL"). For example, the use of SecondLife is growing at a rate of 20% per month in 2007. These new users are all potential customers to these new retail stores. For the purposes of this disclosure, we will use the terms "virtual universe" and "virtual world" interchangeably.

Avatars, which represent a user's presence and position in a virtual world, frequently need to wait prior to receiving a service in a VU. For example, an avatar may have to wait for help from an avatar clerk behind a help desk or while in a waiting room within a VU.

The present invention provides several improvements and advancements which can be applied to each user's avatar, separately or in combination, to enhance the user's experience while his or her avatar waits in a queue:
 (1) customization of the wait state experience with regard to virtual location (e.g. surroundings, background sounds, information streams, etc.);
 (2) automatic transportation of the avatar to another position in the VU when a wait state is over;
 (3) winning a game or successfully responding to challenges while waiting in order to win out-of-order advancement in the queue; and
 (4) depositing of gifts based on the time an avatar has waited in the queue.

These enhancement components can be delivered independently, i.e., the wait state experience can be highly customized for an individual without any form of automatic return to a given, rendered region. Conversely and likewise, auto-transport functionality may be delivered for a uniform, standardized wait state experience.

Suitable Computing Platform

Whereas at least one embodiment of the present invention incorporates, uses, or operates on, with, or through one or more computing platforms, and whereas many devices, even purpose-specific devices, are actually based upon computing platforms of one type or another, it is useful to describe a suitable computing platform, its characteristics, and its capabilities.

Therefore, it is useful to review a generalized architecture of a computing platform which may span the range of implementation, from a high-end web or enterprise server platform, to a personal computer, to a portable PDA or wireless phone.

In one embodiment of the invention, the functionality including the previously described logical processes are performed in part or wholly by software executed by a computer, such as personal computers, web servers, web browsers, or even an appropriately capable portable computing platform, such as personal digital assistant ("PDA"), web-enabled wireless telephone, or other type of personal information management ("PIM") device. In alternate embodiments, some or all of the functionality of the invention are realized in other logical forms, such as circuitry.

Figure 2A:
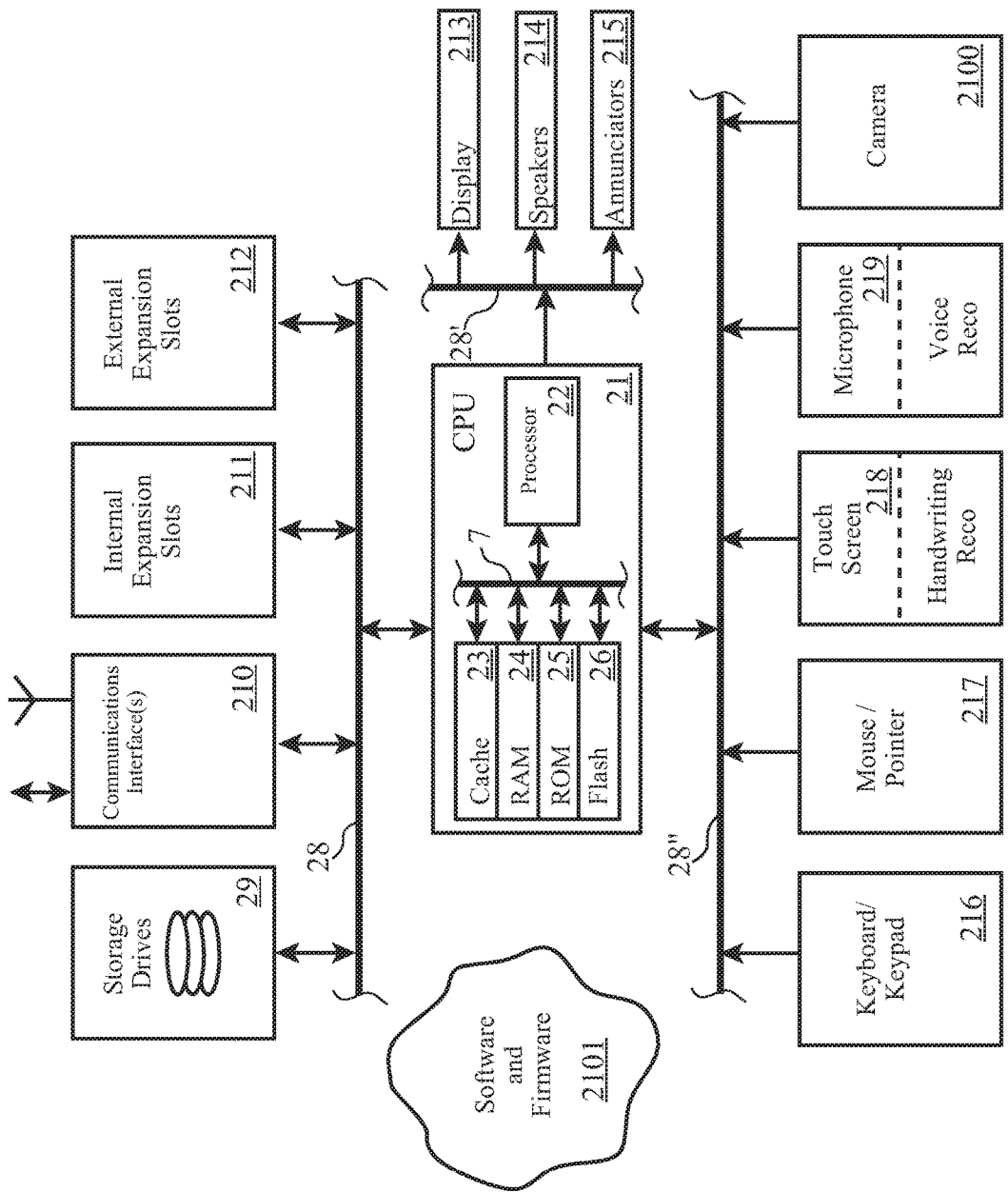
FIGS. 2a and 2b show generalized computing platform architecture, and a generalized organization of software and firmware of such computing platform architecture.

Turning to FIG. 2a, a generalized architecture is presented including a central processing unit (21) ("CPU"), which is typically comprised of a microprocessor (22) associated with random access memory ("RAM") (24) and read-only memory ("ROM") (25). Often, the CPU (21) is also provided with cache memory (23) and programmable FlashROM (26). The interface (27) between the microprocessor (22) and the various types of CPU memory is often referred to as a "local bus", but also may be a more generic or industry standard bus.

Many computing platforms are also provided with one or more storage drives (29), such as hard-disk drives ("HDD"), floppy disk drives, compact disc drives (CD, CD-R, CD-RW, DVD, DVD-R, etc.), and proprietary disk and tape drives (e.g., Iomega Zip™ and Jaz™, Addonics SuperDisk™, etc.). Additionally, some storage drives may be accessible over a computer network.

Many computing platforms are provided with one or more communication interfaces (210), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement ("IrDA") interface, too.

Computing platforms are often equipped with one or more internal expansion slots (211), such as Industry Standard Architecture ("ISA"), Enhanced Industry Standard Architecture ("EISA"), Peripheral Component Interconnect ("PCI"), or proprietary interface slots for the addition of other hardware, such as sound cards, memory boards, and graphics accelerators.

Additionally, many units, such as laptop computers and PDA's, are provided with one or more external expansion slots (212) allowing the user the ability to easily install and remove hardware expansion devices, such as PCMCIA cards, SmartMedia cards, and various proprietary modules such as removable hard drives, CD drives, and floppy drives.

Often, the storage drives (29), communication interfaces (210), internal expansion slots (211) and external expansion slots (212) are interconnected with the CPU (21) via a standard or industry open bus architecture (28), such as ISA, EISA, or PCI. In many cases, the bus (28) may be of a proprietary design.

A computing platform is usually provided with one or more user input devices, such as a keyboard or a keypad (216), and mouse or pointer device (217), and/or a touchscreen display (218). In the case of a personal computer, a full size keyboard is often provided along with a mouse or pointer device, such as a track ball or TrackPoint™. In the case of a web-enabled wireless telephone, a simple keypad may be provided with one or more function-specific keys. In the case of a PDA, a touch-screen (218) is usually provided, often with handwriting recognition capabilities.

Additionally, a microphone (219), such as the microphone of a web-enabled wireless telephone or the microphone of a personal computer, is supplied with the computing platform. This microphone may be used for simply reporting audio and voice signals, and it may also be used for entering user choices, such as voice navigation of web sites or autodialing telephone numbers, using voice recognition capabilities.

Many computing platforms are also equipped with a camera device (2100), such as a still digital camera or full motion video digital camera.

One or more user output devices, such as a display (213), are also provided with most computing platforms. The display (213) may take many forms, including a Cathode Ray Tube ("CRT"), a Thin Flat Transistor ("TFT") array, or a simple set of light emitting diodes ("LED") or liquid crystal display ("LCD") indicators.

One or more speakers (214) and/or annunciators (215) are often associated with computing platforms, too. The speakers (214) may be used to reproduce audio and music, such as the speaker of a wireless telephone or the speakers of a personal computer. Annunciators (215) may take the form of simple beep emitters or buzzers, commonly found on certain devices such as PDAs and PIMs.

These user input and output devices may be directly interconnected (28', 28") to the CPU (21) via a proprietary bus structure and/or interfaces, or they may be interconnected through one or more industry open buses such as ISA, EISA, PCI, etc. The computing platform is also provided with one or more software and firmware (2101) programs to implement the desired functionality of the computing platforms.

Figure 2B:
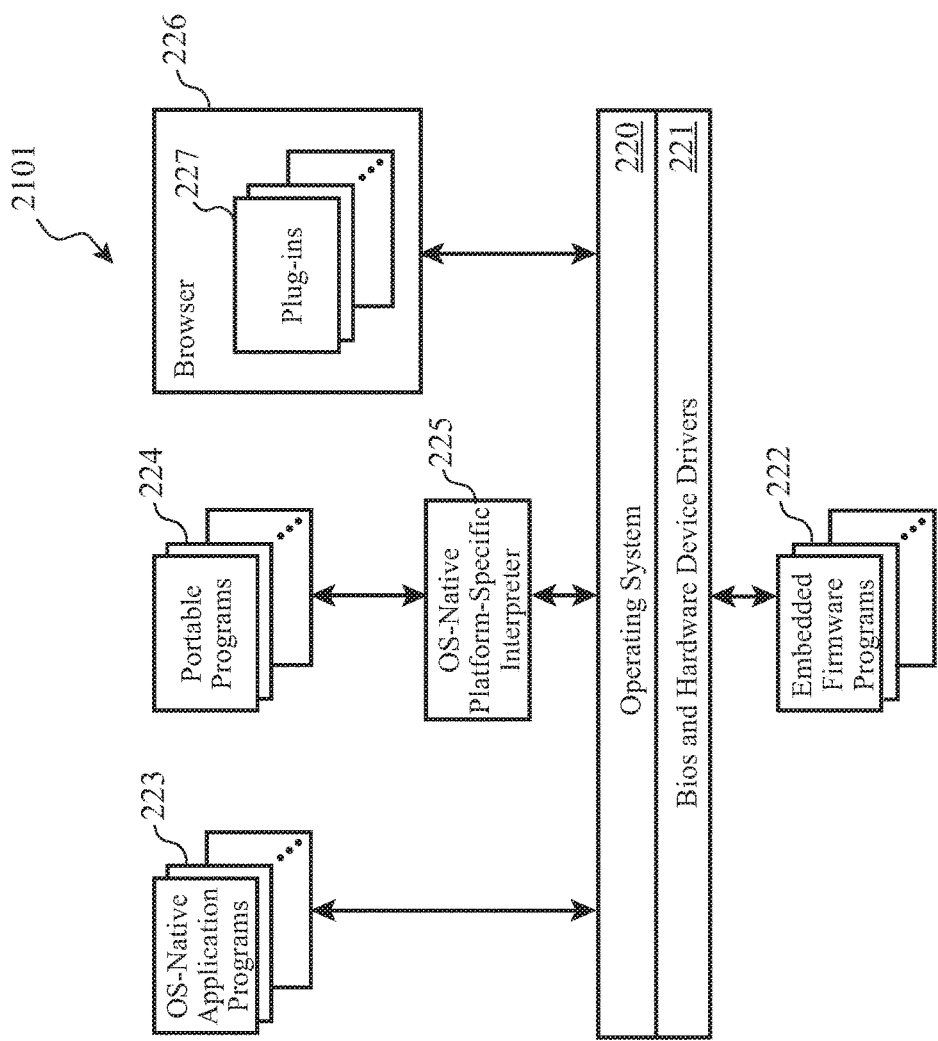

Turning to now FIG. 2b, more detail is given of a generalized organization of software and firmware (2101) on this range of computing platforms. One or more operating system ("OS") native application programs (223) may be provided on the computing platform, such as word processors, spreadsheets, contact management utilities, address book, calendar, email client, presentation, financial and bookkeeping programs.

Additionally, one or more "portable" or device-independent programs (224) may be provided, which must be interpreted by an OS-native platform-specific interpreter (225), such as Java™ scripts and programs.

Often, computing platforms are also provided with a form of web browser or micro-browser (226), which may also include one or more extensions to the browser such as browser plug-ins (227).

The computing device is often provided with an operating system (220), such as Microsoft Windows™, UNIX, IBM OS/2™, IBM AIX™, open source LINUX, Apple's MAC OS™, or other platform specific operating systems. Smaller devices such as PDA's and wireless telephones may be equipped with other forms of operating systems such as real-time operating systems ("RTOS") or Palm Computing's PalmOS™.

A set of basic input and output functions ("BIOS") and hardware device drivers (221) are often provided to allow the operating system (220) and programs to interface to and control the specific hardware functions provided with the computing platform.

Additionally, one or more embedded firmware programs (222) are commonly provided with many computing platforms, which are executed by onboard or "embedded" microprocessors as part of the peripheral device, such as a micro controller or a hard drive, a communication processor, network interface card, or sound or graphics card.

As such, FIGS. 2a and 2b describe in a general sense the various hardware components, software and firmware programs of a wide variety of computing platforms, including but not limited to personal computers, PDAs, PIMs, web-enabled telephones, and other appliances such as WebTV™ units. As such, we now turn our attention to disclosure of the present invention relative to the processes and methods preferably implemented as software and firmware on such a computing platform. It will be readily recognized by those skilled in the art that the following methods and processes may be alternatively realized as hardware functions, in part or in whole, without departing from the spirit and scope of the invention.

Computer-Readable Media Embodiments

In another embodiment of the invention, logical processes according to the invention and described herein are encoded on or in one or more computer-readable media. Some computer-readable media are read-only (e.g. they must be initially programmed using a different device than that which is ultimately used to read the data from the media), some are write-only (e.g. from the data encoders perspective they can only be encoded, but not read simultaneously), or read-write. Still some other media are write-once, read-many-times.

Some media are relatively fixed in their mounting mechanisms, while others are removable, or even transmittable. All computer-readable media form two types of systems when encoded with data and/or computer software: (a) when removed from a drive or reading mechanism, they are memory devices which generate useful data-driven outputs when stimulated with appropriate electromagnetic, electronic, and/or optical signals; and (b) when installed in a drive or reading device, they form a data repository system accessible by a computer.

Figure 4A:
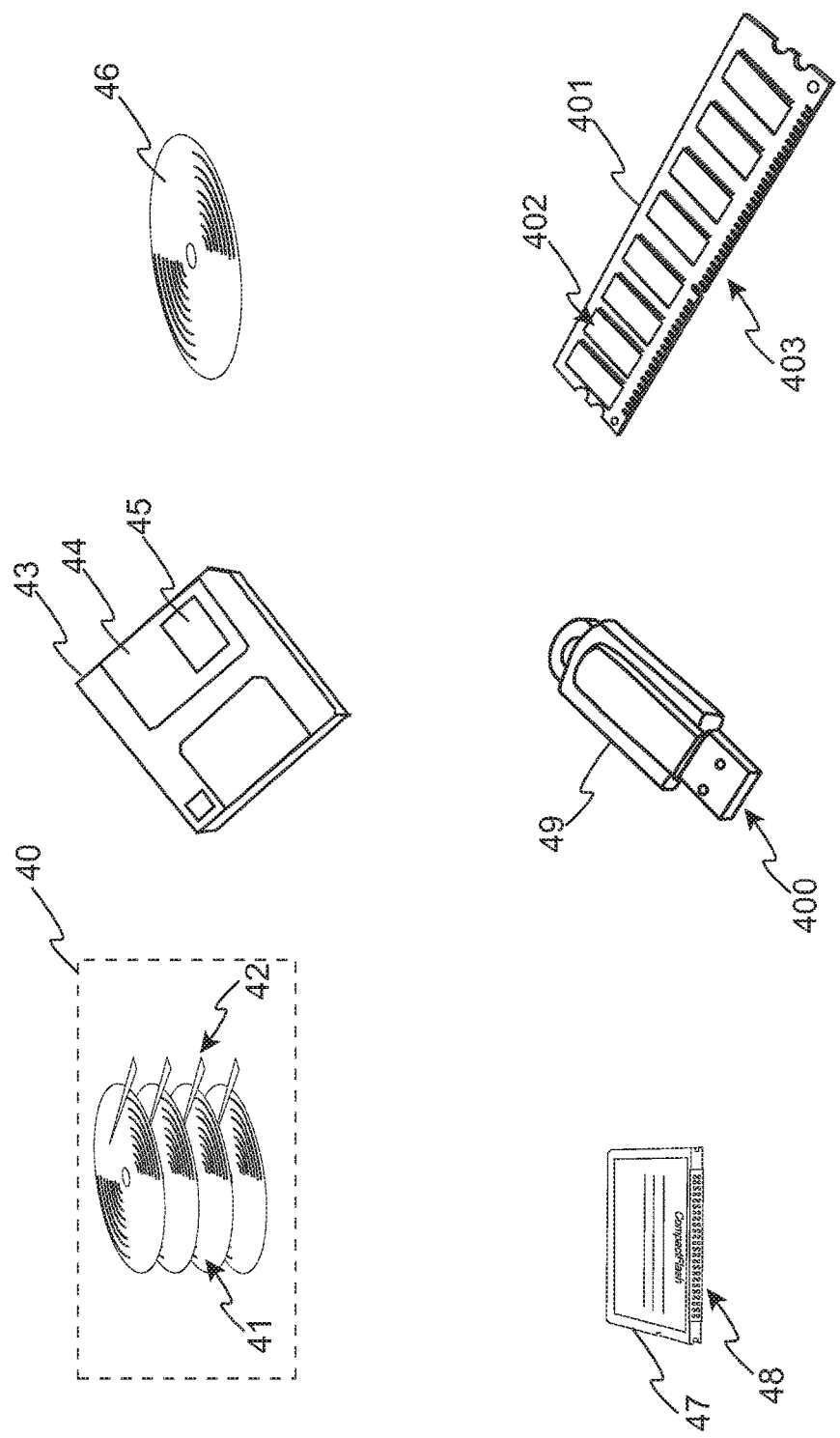
FIGS. 4a, 4b and 4c, illustrate computer readable media of various removable and fixed types, signal transceivers, and parallel-to-serial-to-parallel signal circuits.

FIG. 4a illustrates some computer readable media including a computer hard drive (40) having one or more magnetically encoded platters or disks (41), which may be read, written, or both, by one or more heads (42). Such hard drives are typically semi-permanently mounted into a complete drive unit, which may then be integrated into a configurable computer system such as a Personal Computer, Server Computer, or the like.

Similarly, another form of computer readable media is a flexible, removable "floppy disk" (43), which is inserted into a drive which houses an access head. The floppy disk typically includes a flexible, magnetically encodable disk which is accessible by the drive head through a window (45) in a sliding cover (44).

A Compact Disk ("CD") (46) is usually a plastic disk which is encoded using an optical and/or magneto-optical process, and then is read using generally an optical process. Some CD's are read-only ("CD-ROM"), and are mass produced prior to distribution and use by reading-types of drives. Other CD's are writable (e.g. "CD-RW", "CD-R"), either once or many time. Digital Versatile Disks ("DVD") are advanced versions of CD's which often include double-sided encoding of data, and even multiple layer encoding of data. Like a floppy disk, a CD or DVD is a removable media.

Another common type of removable media are several types of removable circuit-based (e.g. solid state) memory devices, such as Compact Flash ("CF") (47), Secure Data ("SD"), Sony's MemoryStick, Universal Serial Bus ("USB") FlashDrives and "Thumbdrives" (49), and others. These devices are typically plastic housings which incorporate a digital memory chip, such as a battery-backed random access chip ("RAM"), or a Flash Read-Only Memory ("FlashROM"). Available to the external portion of the media is one or more electronic connectors (48, 400) for engaging a connector, such as a CF drive slot or a USB slot. Devices such as a USB FlashDrive are accessed using a serial data methodology, where other devices such as the CF are accessed using a parallel methodology. These devices often offer faster access times than disk-based media, as well as increased reliability and decreased susceptibility to mechanical shock and vibration. Often, they provide less storage capability than comparably priced disk-based media.

Yet another type of computer readable media device is a memory module (403), often referred to as a SIMM or DIMM. Similar to the CF, SD, and FlashDrives, these modules incorporate one or more memory devices (402), such as Dynamic RAM ("DRAM"), mounted on a circuit board (401) having one or more electronic connectors for engaging and interfacing to another circuit, such as a Personal Computer motherboard. These types of memory modules are not usually encased in an outer housing, as they are intended for installation by trained technicians, and are generally protected by a larger outer housing such as a Personal Computer chassis.

Figure 4B:
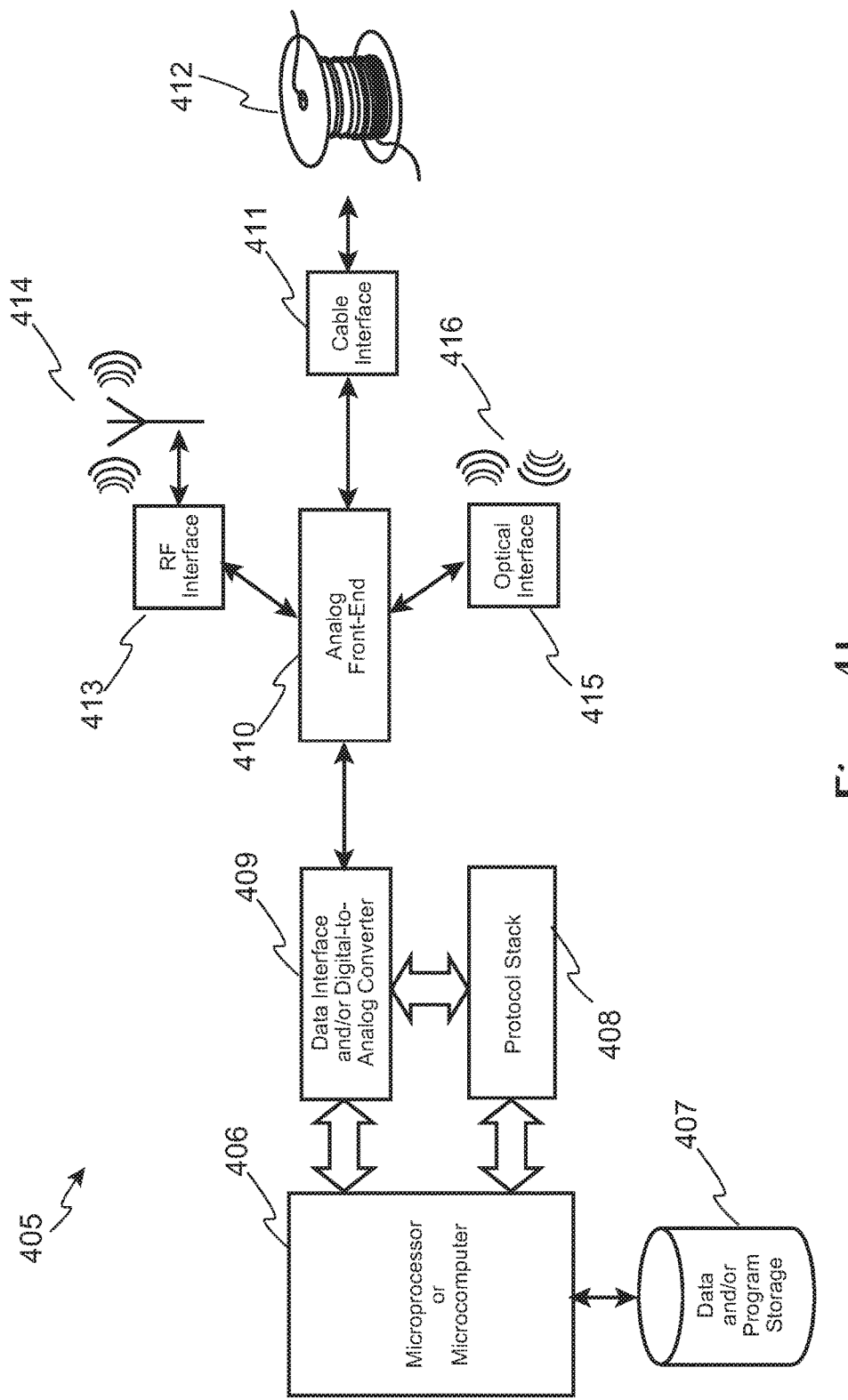

Turning now to FIG. 4b, another embodiment option (405) of the present invention is shown in which a computer-readable signal is encoded with software, data, or both, which implement logical processes according to the invention. FIG. 4b is generalized to represent the functionality of wireless, wired, electro-optical, and optical signaling systems. For example, the system shown in FIG. 4b can be realized in a manner suitable for wireless transmission over Radio Frequencies ("RF"), as well as over optical signals, such as InfraRed Data Arrangement ("IrDA"). The system of FIG. 4b may also be realized in another manner to serve as a data transmitter, data receiver, or data transceiver for a USB system, such as a drive to read the aforementioned USB FlashDrive, or to access the serially-stored data on a disk, such as a CD or hard drive platter.

In general, a microprocessor or microcontroller (406) reads, writes, or both, data to/from storage for data, program, or both (407). A data interface (409), optionally including a digital-to-analog converter, cooperates with an optional protocol stack (408), to send, receive, or transceive data between the system front-end (410) and the microprocessor (406). The protocol stack is adapted to the signal type being sent, received, or transceived. For example, in a Local Area Network ("LAN") embodiment, the protocol stack may implement Transmission Control Protocol/Internet Protocol ("TCP/IP"). In a computer-to-computer or computer-to-peripheral embodiment, the protocol stack may implement all or portions of USB, "FireWire", RS-232, Point-to-Point Protocol ("PPP"), etc.

The system's front-end, or analog front-end, is adapted to the signal type being modulated, demodulate, or transcoded. For example, in an RF-based (413) system, the analog front-end comprises various local oscillators, modulators, demodulators, etc., which implement signaling formats such as Frequency Modulation ("FM"), Amplitude Modulation ("AM"), Phase Modulation ("PM"), Pulse Code Modulation ("PCM"), etc. Such an RF-based embodiment typically includes an antenna (414) for transmitting, receiving, or transceiving electro-magnetic signals via open air, water, earth, or via RF wave guides and coaxial cable. Some common open air transmission standards are BlueTooth, Global Services for Mobile Communications ("GSM"), Time Division Multiple Access ("TDMA"), Advanced Mobile Phone Service ("AMPS"), and Wireless Fidelity ("Wi-Fi").

In another example embodiment, the analog front-end may be adapted to sending, receiving, or transceiving signals via an optical interface (415), such as laser-based optical interfaces (e.g. Wavelength Division Multiplexed, SONET, etc.), or Infra Red Data Arrangement ("IrDA") interfaces (416). Similarly, the analog front-end may be adapted to sending, receiving, or transceiving signals via cable (412) using a cable interface, which also includes embodiments such as USB, Ethernet, LAN, twisted-pair, coax, Plain-old Telephone Service ("POTS"), etc.

Signals transmitted, received, or transceived, as well as data encoded on disks or in memory devices, may be encoded to protect it from unauthorized decoding and use. Other types of encoding may be employed to allow for error detection, and in some cases, correction, such as by addition of parity bits or Cyclic Redundancy Codes ("CRC"). Still other types of encoding may be employed to allow directing or "routing" of data to the correct destination, such as packet and frame-based protocols.

Figure 4C:
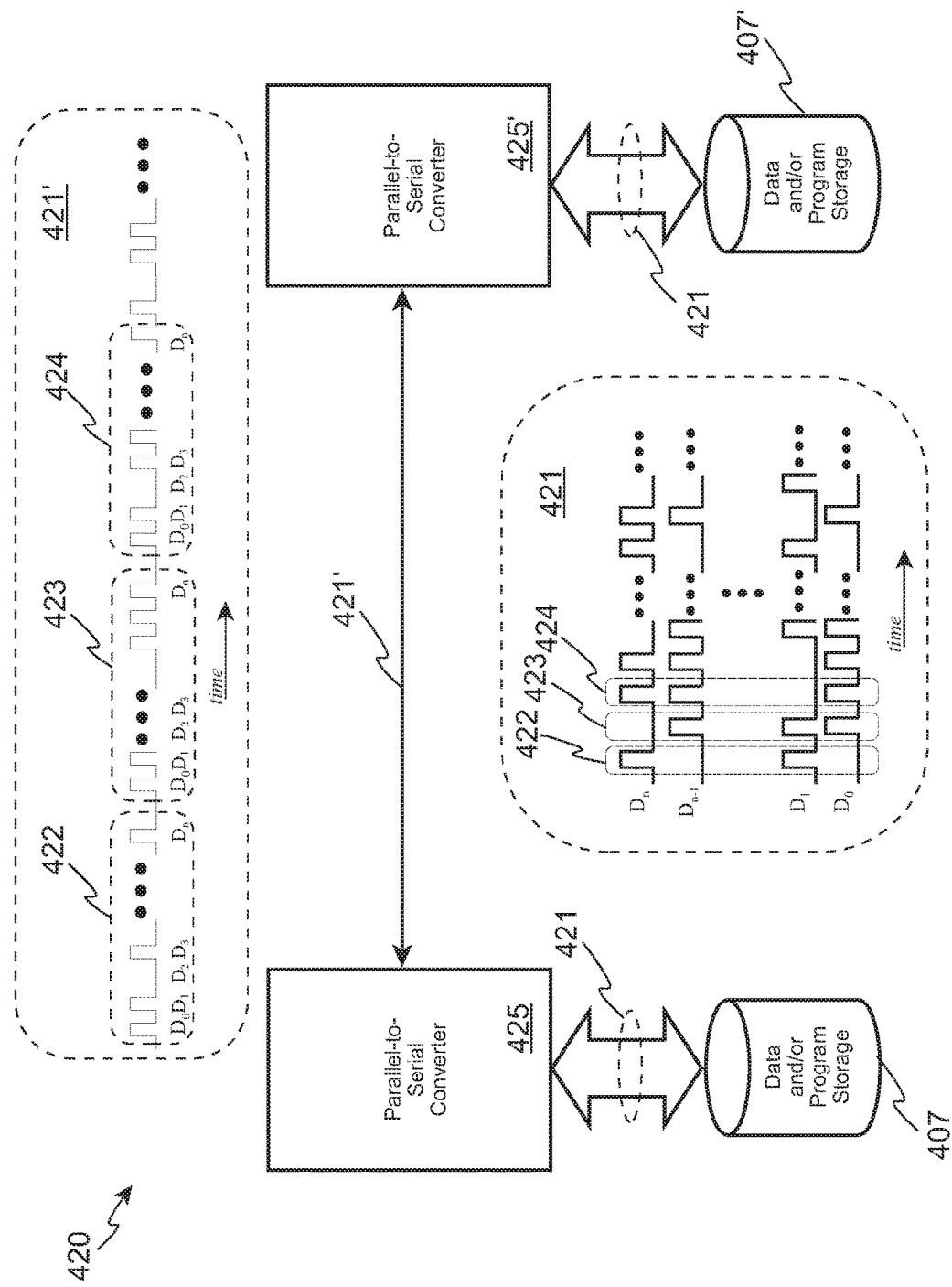

FIG. 4c illustrates conversion systems which convert parallel data to and from serial data. Parallel data is most often directly usable by microprocessors, often formatted in 8-bit wide bytes, 16-bit wide words, 32-bit wide double words, etc. Parallel data can represent executable or interpretable software, or it may represent data values, for use by a computer. Data is often serialized in order to transmit it over a media, such as a RF or optical channel, or to record it onto a media, such as a disk. As such, many computer-readable media systems include circuits, software, or both, to perform data serialization and re-parallelization.

Parallel data (421) can be represented as the flow of data signals aligned in time, such that parallel data unit (byte, word, d-word, etc.) (422, 423, 424) is transmitted with each bit $D_0$-$D_n$ being on a bus or signal carrier simultaneously, where the "width" of the data unit is n−1. In some systems, $D_0$ is used to represent the least significant bit ("LSB"), and in other systems, it represents the most significant bit ("MSB"). Data is serialized (421) by sending one bit at a time, such that each data unit (422, 423, 424) is sent in serial fashion, one after another, typically according to a protocol.

As such, the parallel data stored in computer memory (407, 407') is often accessed by a microprocessor or Parallel-to-Serial Converter (425, 425') via a parallel bus (421), and exchanged (e.g. transmitted, received, or transceived) via a serial bus (421'). Received serial data is converted back into parallel data before storing it in computer memory, usually. The serial bus (421') generalized in FIG. 4c may be a wired bus, such as USB or Firewire, or a wireless communications medium, such as an RF or optical channel, as previously discussed.

In these manners, various embodiments of the invention may be realized by encoding software, data, or both, according to the logical processes of the invention, into one or more computer-readable mediums, thereby yielding a product of manufacture and a system which, when properly read, received, or decoded, yields useful programming instructions, data, or both, including, but not limited to, the computer-readable media types described in the foregoing paragraphs.

General Arrangements of Virtual Worlds

Figure 5:
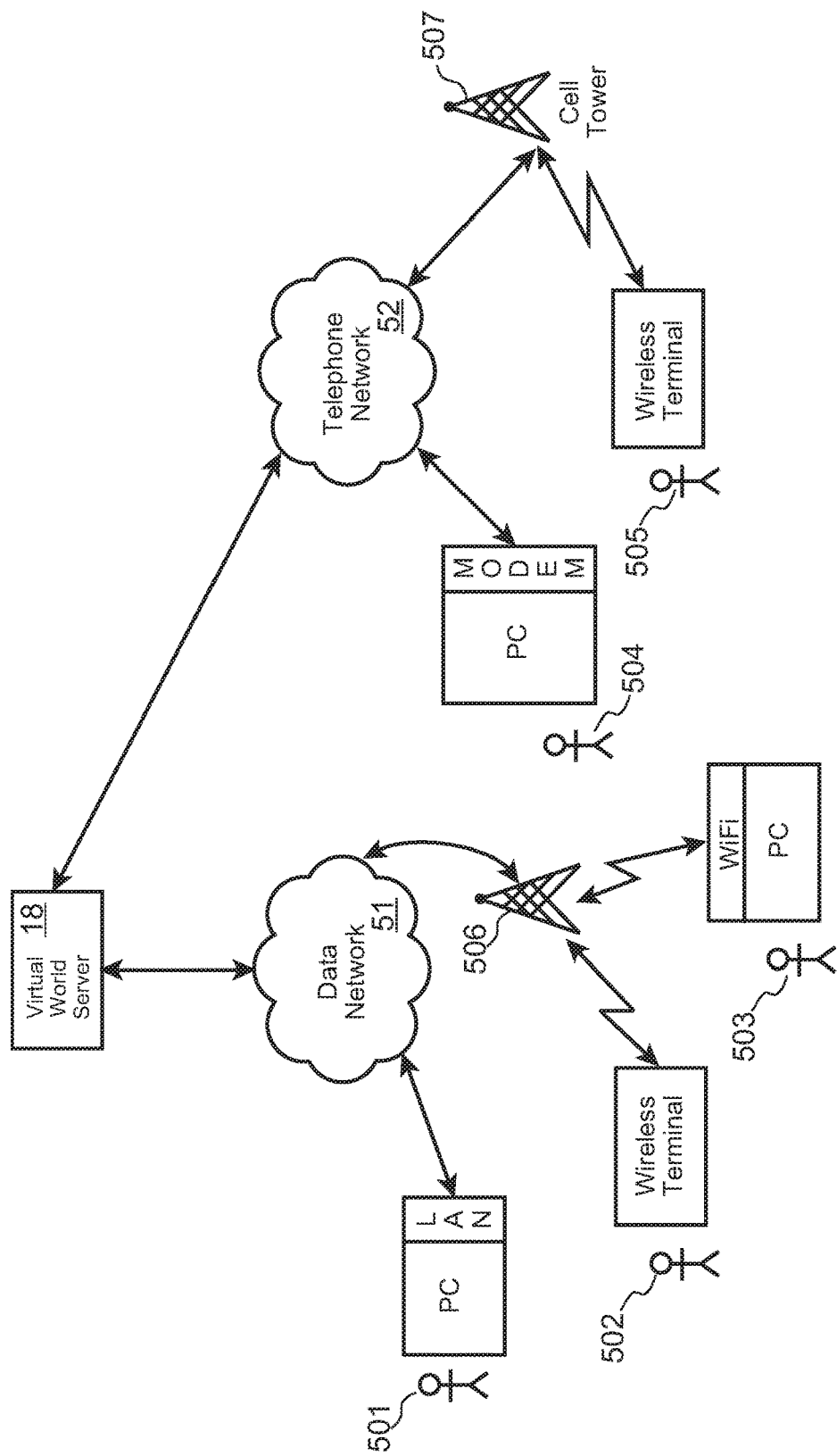
FIG. 5 illustrates arrangements of systems and networks used in order to interact with a virtual world server.

Turning to FIG. 5, a general arrangement of components, networks, and users of a virtual world is shown. A virtual world server (18) is interconnected through a data network (51), such as the Internet or an intranet, or a telephone network (52), such as a public switched telephone network ("PSTN") or a digital telephone network (e.g. digital cellular, Integrated Services Digital Network, Digital Subscriber Line, etc.). Many virtual world server's are interconnected to a combination or data and telephone networks, whereas the convergence of the two types of networks have rendered some networks difficult to clearly distinguish as exclusively data or telephone. For example, Voice over Internet ("VoIP") protocol has allowed telephone calls to be carried by traditionally data-only networks. And, Modulate-Demodulate ("modem") devices have long since allowed data communications over telephone lines. Further, traditionally content oriented networks, such as cable television networks, have also been adapted to carry digitized telephone calls and data connections to the Internet.

Of particular popularity in recent years are various types of wireless networks, from cellular telephone networks, to shorter range networks, such as "WiFi" and Blue Tooth networks, some of which use "towers" (507) and others of which use wireless access points (506) to interconnect a wireless device to a wired network.

In the arrangement of FIG. 5, users (501-505) access the Virtual World server (18) though the various networks (51, 52) using terminal devices such as a personal computer ("PC") with a local area network ("LAN") interface, a wireless terminal such as a cellular telephone or "WiFi" equipped laptop PC, or even a PC with a telephone or cable modem.

Major Functions of a Virtual World Server

Figure 6:
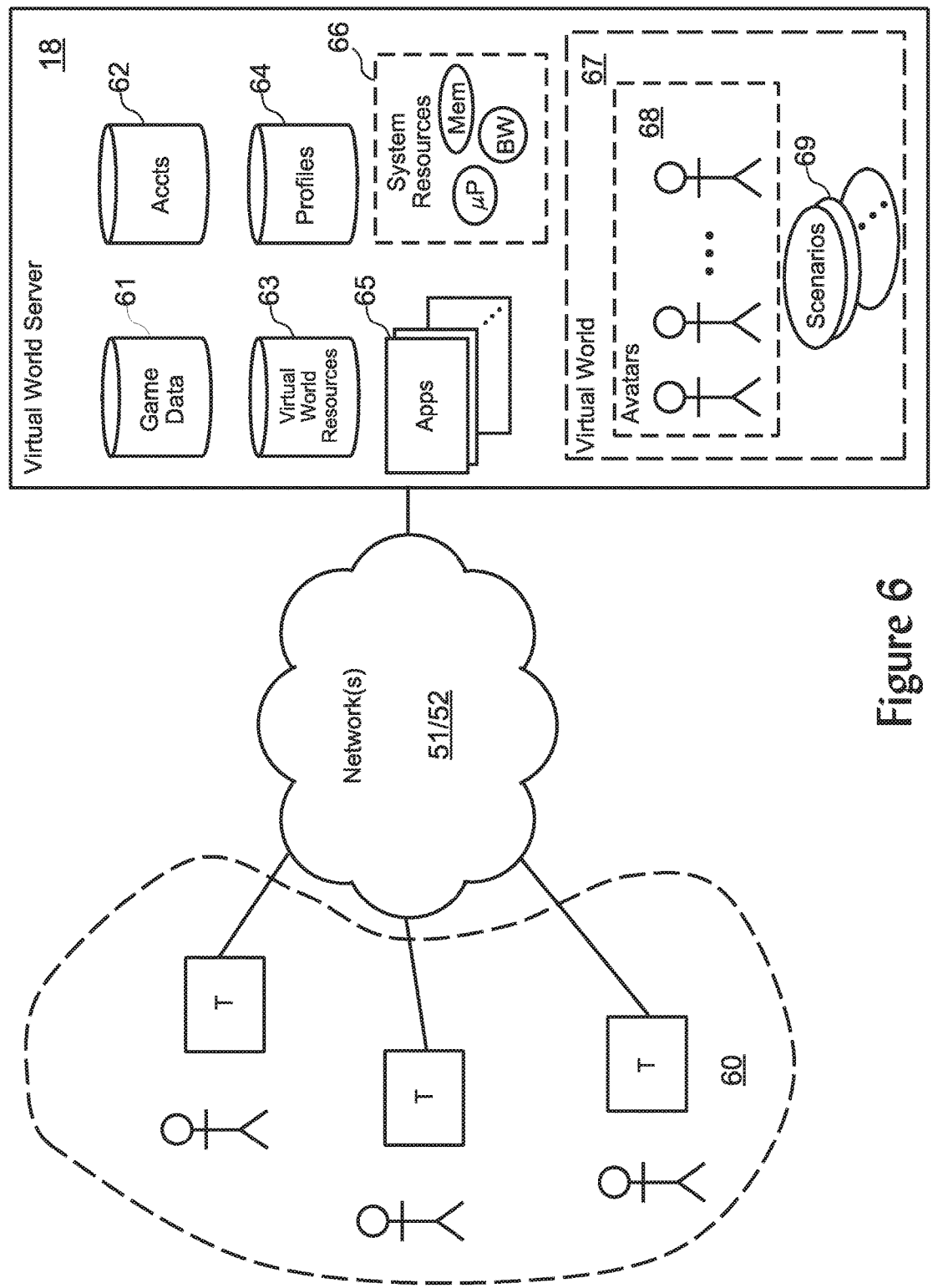
FIG. 6 provides additional information regarding primary components or functional sub-systems of a virtual world server.

FIG. 6 shows some of the major or primary functions of a Virtual World server (18) which is interconnected to one or more user's via their terminals (60) through one or more networks (51, 52). This depiction is a generalization of a virtual world environment, whereas specific virtual world platforms are, to date, typically proprietary in nature. As such, FIG. 6 is presented for reference only, and for the ease of understanding the present invention. It is within the skill of those in the art to adapt, configure, and implement the invention, as described herein, within a specific, proprietary virtual world environment.

Within the Virtual World server (18), there are a number of application programs (65) running, which utilize or game data (61), Virtual World resources (63), user account information (62) and profile (64). Such application programs, and extensions thereto, are often provided or developed in programming languages such as C or Python.

The Virtual World server (18) has integrated into it one or more microprocessors, memory devices and sub-systems, and communications bandwidth or capabilities (66).

Most virtual world servers can maintain and operate more than one "virtual worlds" simultaneously (67). In each of the virtual world's scenarios or sub-worlds (69), user's can use a different or the same avatars (68) to represent themselves.

Underlying Mechanisms of Interaction in VUs

Figure 7:
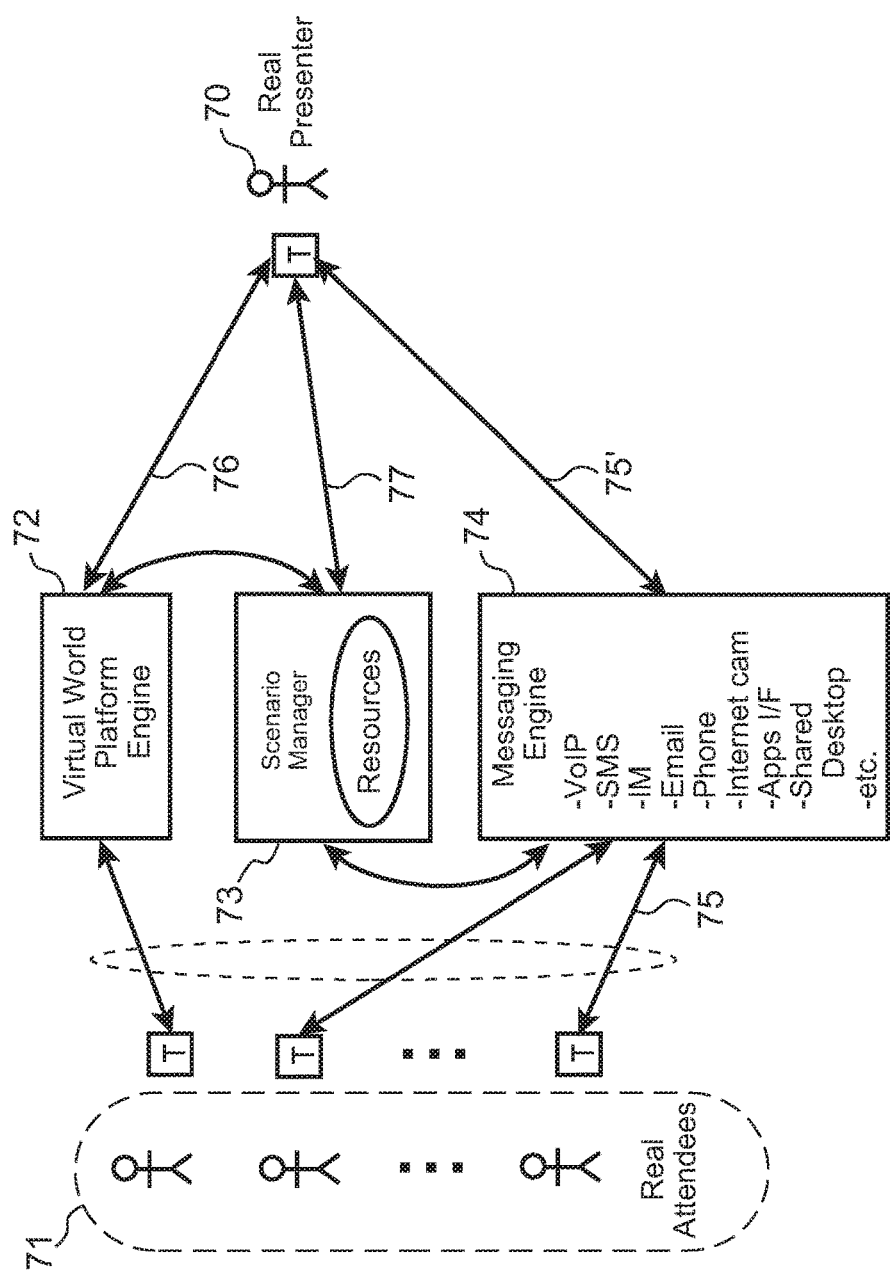
FIG. 7 depicts interactions between various types of users and major functional portions of a virtual world server.

FIG. 7 illustrates a generalized arrangement of a virtual world system which allows the users to interact with each other and with the scenarios created by and maintained by the Virtual World server. This depiction is a generalization of a virtual world interaction scheme, whereas specific virtual world platforms are, to date, typically proprietary in nature. As such, FIG. 7 is presented for reference only, and for the ease of understanding the present invention. It is within the skill of those in the art to adapt, configure, and implement the invention, as described herein, within a specific, proprietary virtual world environment.

In many scenarios, the users are divided into two or more classes of user, such as a presenter (70) and attendees (71). Each class of user may have greater or fewer capabilities within the world, such as a presenter being allowed to share a desktop presentation file with the attendees, but the attendees not being able to share their own desktop applications with other attendees.

In such an arrangement, the primary method of interaction between users and the applications of the Virtual World server is through a variety of messaging capabilities (34), such as VoIP, text messaging ("SMS"), instant messaging (e.g. America Online's Instant Messenger or Lotus' SameTime), electronic mail, telephone audio, internet camera audio/video, application programming interfaces ("API"), shared desktop technologies, and the like.

For example, during a Virtual World conference or presentation, the real presenter (70) may communicate (75, 75') with the real attendees (71) via their virtual presences (e.g. avatars) of the virtual scenario. Further, the real presenter (70) may also communicate (77) with a scenario manager portion (73) of the Virtual World server to accomplish such functions as reserving resources necessary to create and maintain the virtual scenario, freezing the scenario, and controlling attendance to the scenario. The real presenter may also communicate (76) with portions of the Virtual World "engine" (72) to accomplish other administrative functions, as may be necessary.

Illustrative Virtual Scenario

Many virtual worlds provide a three-dimensional visual simulation of each sub-world or scenario, accompanied by appropriate text and/or audio, in order to provide a believable, but not necessarily "realistic", rendering of the scenario to the users. For example, in "fantasy" scenarios, avatars of users may be animals, hypothetical creatures, etc., and the landscape of the scenario may be another plant or a future civilization.

However, in many business-to-business scenarios, such as corporate meetings or training sessions, the scenarios are more realistic in their appearance, albeit still virtual.

Figure 8:
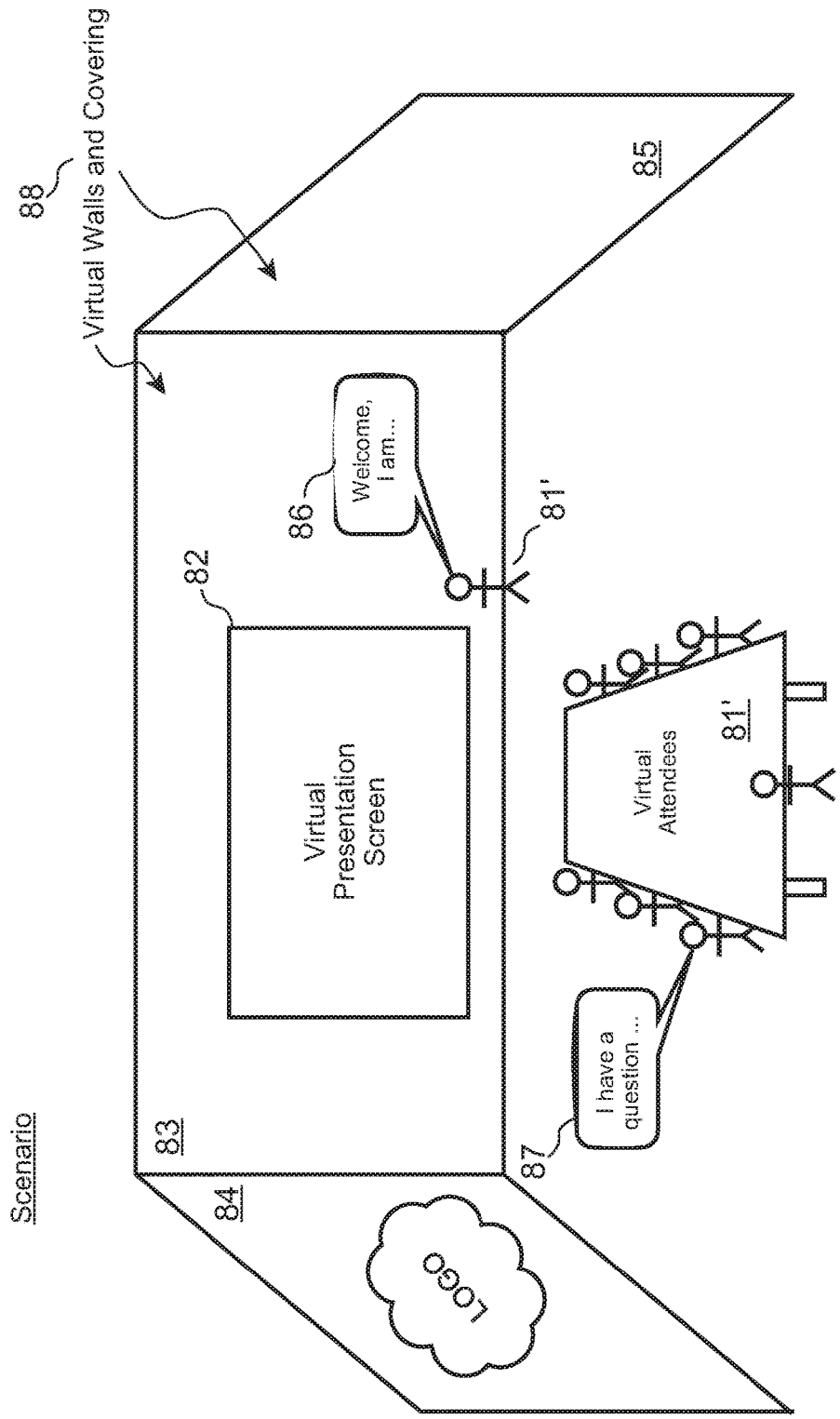
FIG. 8 illustrates a hypothetical three-dimensional view of a "world" scenario in which a virtual meeting, presentation, or conference is being held.

Turning to FIG. 8, an example depiction of such a realistic scenario is provided, in which the avatar (81') for the real meeting facilitator is shown along side a virtual presentation screen (82) as if the facilitator were in a real meeting room with walls (83, 84, 85), and a floor area where the avatars (81') of the meeting attendees are shown.

To enhance the experience, the virtual presentation screen may show a portion of the facilitator's actual terminal device's screen, such as a portion of a Microsoft Windows™ desktop interface, or may be filled with information provided to the Virtual World server from an application program, such as a mobile phone or PDA-based presentation program. Still further to enhance the experience of the virtual conference room, the virtual walls are decorated according to the presenter's (or other administrator's) preferences, including coverings, skins, or lighting (88), and/or one or more company logos (84).

In such a scenario, the presenter or administrator of the virtual conference schedules, reserves, or otherwise configures these environment choices, including possibly restrictions as to which other users may be attendees. Such scheduling and reservation activities are usually performed in advance, and may need to be revised as the number of virtual attendees becomes more and more certain closer to time of the virtual conference.

Logical Processes of the Invention

This invention includes a system and methods for customizing the content of material presented to an avatar while in a "wait state", such as while waiting for help from a help desk, while waiting in a queue, or while waiting for a virtual conference or training session to commence. The following logical processes can be implemented as extensions to functionality of virtual world servers, clients, or both, in the form of software, circuitry, or both software and circuitry (e.g. "hardware"). It is within the skill of those in the art to make various design decisions regarding implementation of the entire inventive processes into software or hardware, or to divide the functionality between software and hardware. In this context, hardware is used to represent programmable embedded controllers (e.g. "firmware and microcontrollers"), as well as programmable logic devices (e.g. "programmable array logic", "gate array logic", etc.), and custom circuits (e.g. application specific integrated circuits, circuit boards, etc.).

Wait State Experience Preferences. The customized content and/or actions are provided to the avatar according to an avatar resident's preferences. In general, each avatar has an avatar wait profile ("AWP") that specifies wait state experience preferences. Preferences may include broadly the choice of environments, e.g., Alpine mountains or a tropical beach, but may also include the presence of other avatars (human or robotic), furniture, other sights, sounds, colors, and listening preferences, such as style of music, type of news streams, favorite radio station or channel, and e-commerce preferences for personalized ads or promotions.

According to another aspect of the present invention, the AWP may specify other things the avatar may do or be presented with during a waiting state. For example, the avatar may wish to be teleported to a preferred waiting room with games or parks to explore while waiting.

AI AWP. The AWP may be an actual file created for or by the user which the avatar represents. Alternatively, the information on preferences for a user wait state may be based on artificial intelligence ("AI"), wherein the VU system infers that the user is interested in forest locations based on an analysis of the user's inventory, past history of travel in the VU, past conversations in the VU, a user's history of purchases, the amount of money that a user has in the VU, the appearance of the avatar, the avatar's friend list in the VU, or past waiting room preferences.)

Dynamic AWP. Alternatively, the avatar may be presented in real time with a selection of possible wait state environments and make a selection (e.g. a set of landscapes, waiting rooms, etc.) at the time the wait state commences, or at one or more times during the wait period. For example, an avatar may be presented no options for alternative experience during the first two minutes of waiting, but upon completion of two minutes, may be offered a game to play, or a choice of rewards for continuing to wait.

AWP Storage. Each avatar's preferences may be stored entirely on the VU server, and the entire environment constructed from such server-stored content. Alternatively, all of the wait state content may be stored on the VU client system, and be accessible by the client software. Hybrid storage embodiments are possible alternatives, as well, wherein some environment details are stored on the local client computer.

In any of these storage embodiments, and especially the embodiments in which the client stores some or all of the wait state environment content, it is a further enhancement of the system to configure the client to receive media feeds (e.g., news reports or music) from the server.

Proxy Waiting. Optionally, an avatar may "pick a number" and go about his or her business within the VU, even teleporting to a new area. During the wait period, a proxy avatar corresponding to the user is kept in the queue, and when the avatar's number comes up, the real avatar may either be automatically teleported back or be prompted before being returned. Again, a gift may be offered for returning at the end of the wait.

Wait State Processing. The VU system identifies the user's desire by accessing the AWP, or alternatively by determining a dynamic AWP, prior to entering the wait state. Appropriate alternative content (e.g. other than the default experience provided in the queue) is then presented to the avatar during the wait state period.

The alternative wait state content ("AWSC") may be tailored to the estimated wait time. For example, an user may not prefer to hear a long story or to be transported to a virtual Hawaii if the interrupt was likely to be very short.

In another embodiment, demographic information about the user may be used to customize the presented material. For example, if the user is from Albania, local news from Albania may be presented, along with Albanian artwork hanging on the walls. On the other hand, if the user is calling from New Jersey, local news from that state may be presented. Customer service representatives ("CSRs") may be made available in the wait area to provide special assistance. Product information or demonstrations for the items of interest would be an option.

This may be implemented in a number of ways. Avatar profiles may be registered with a service agency that manages a trans-vendor service, or the avatar profile may be accessed by a help desk likely to make avatars wait.

User actions may alter his or her place in the wait queue, as well. For example, a user or customer may win a game of chance or purchase an expensive item, either of which moves him to the top of the queue.

Then, according to one aspect of an alternative embodiment, wait experience data are provided to the CSR once the customer returns to the store. This enables the CSR to know how long the customer waited, and what items or activities were of interest to him during the wait.

When the waiting state is about to end, the VU system redirects the user's attention as needed.

Optionally, the longer the avatar must wait, the more gifts are deposited in his inventory as an incentive to wait, as an apology for causing a long wait state, or as a remuneration for waiting. In some circumstances, customers may attempt to abuse this benefit by continually returning to the wait state in order to receive free gifts. This may be done by people with time to spare (e.g. teenagers) or "zombie" avatars. As the wait experience data will be recorded, rules may optionally be applied to prevent abuse. For example, after some established number of wait experiences without a purchase, a human CSR may be assigned to talk directly with the customer to ensure he is valid and "real" (e.g. not a zombie).

Figure 1B:
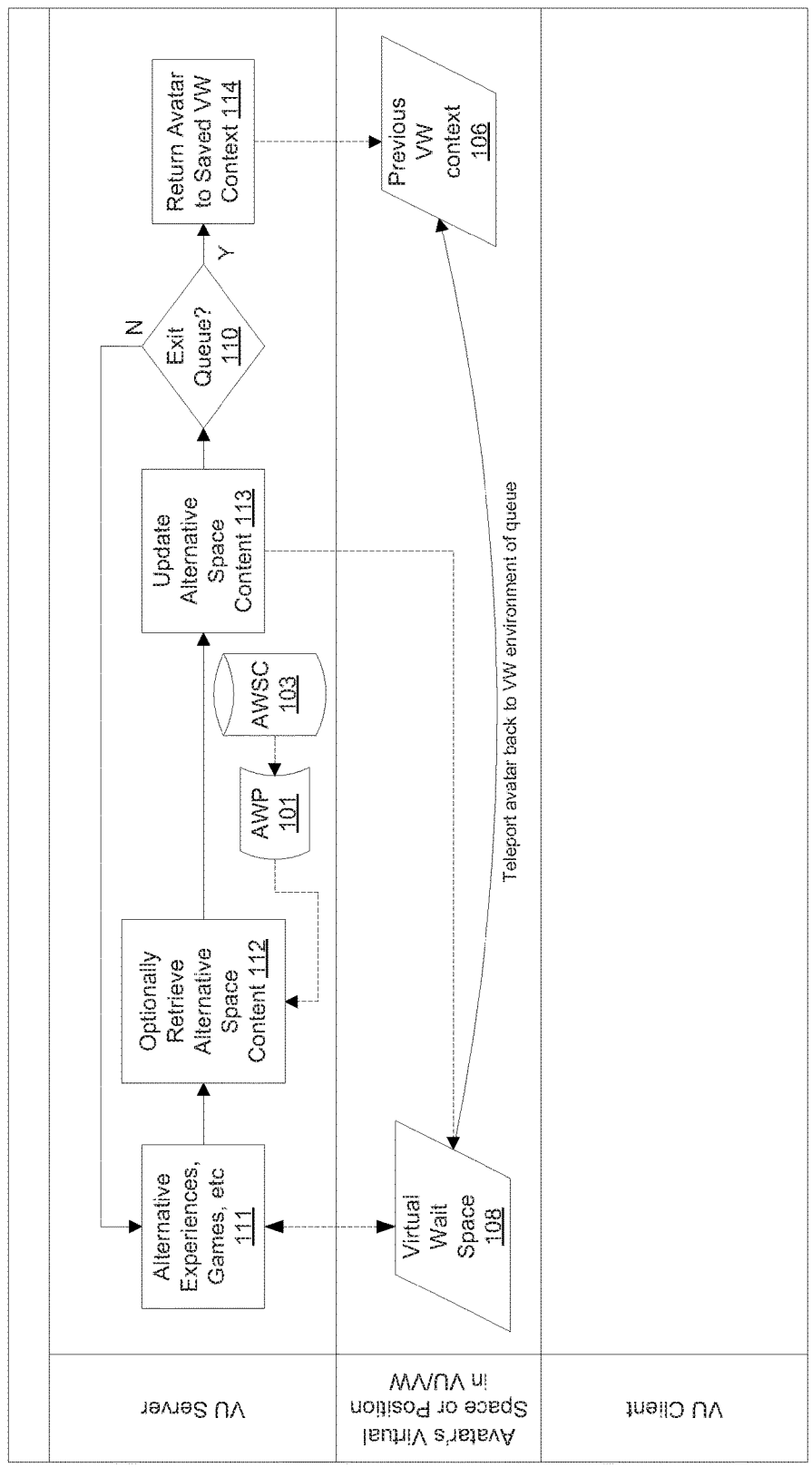

Referring to FIGS. 1a-1b and with the foregoing features in mind, a generalized logical process for providing some or all of these functions includes the following steps performed by the VU server, the VU client, or cooperatively between the VU server and the VU client:

(1) VU server and/or VU client determines that the user is entering waiting state (100);
(2) the AWP (101) is accessed, dynamically created, or options for AWSC are presented to the avatar (102);
(3) based on the AWP and/or the user-selections of AWSC options, the indicated AWSC (background music, background sounds, visual environmental elements, data streams, information feeds, game logic, etc.) (103) is retrieved (104) from the VU server storage, the VU client storage, or from both VU server and VU client;
(4) the current environment (106) for the avatar is "saved" (e.g. scenery, background sounds, etc.) (105);
(5) a virtual wait space ("VWS") (108) is created (107) containing the AWSC;
(6) the avatar is placed (109) in a desirable waiting state and transported to the VWS;
(7) as time elapses during the wait state (110), optional incentives placed in user inventory (e.g. gift items), and optional changes to the VWS may be implemented using additional AWSC options and content (e.g. scenery may change, background sounds may change, information feeds may be changed) (113);
(8) the avatar representing the customer or user remains in queue while in the VWS area (111);
(9) optionally, customer action while in wait area may change his place in the queue (e.g. customer purchases promotional product, wins a challenge or game, etc.)
(10) when the VU server and/or VU client determines that wait state is about to end (111), the VU server and/or VU client returns user's avatar to the pre-waiting environment which was earlier save, whilst recording data about transactions completed during the wait state while in the virtual wait space (e.g. time waited, activities while in wait state)
(11) if a CSR is conferenced to the user's avatar in the VW, then the system optionally provides wait transaction data to the CSR helping customer Service-Based Embodiments Alternative embodiments of the present invention include some or all of the foregoing logical processes and functions of the invention being provided by configuring software, deploying software, downloading software, distributing software, or remotely serving clients in an on demand environment.

Software Deployment Embodiment. According to one embodiment of the invention, the methods and processes of the invention are distributed or deployed as a service by a service provider to a client's computing system(s).

Figure 3A:
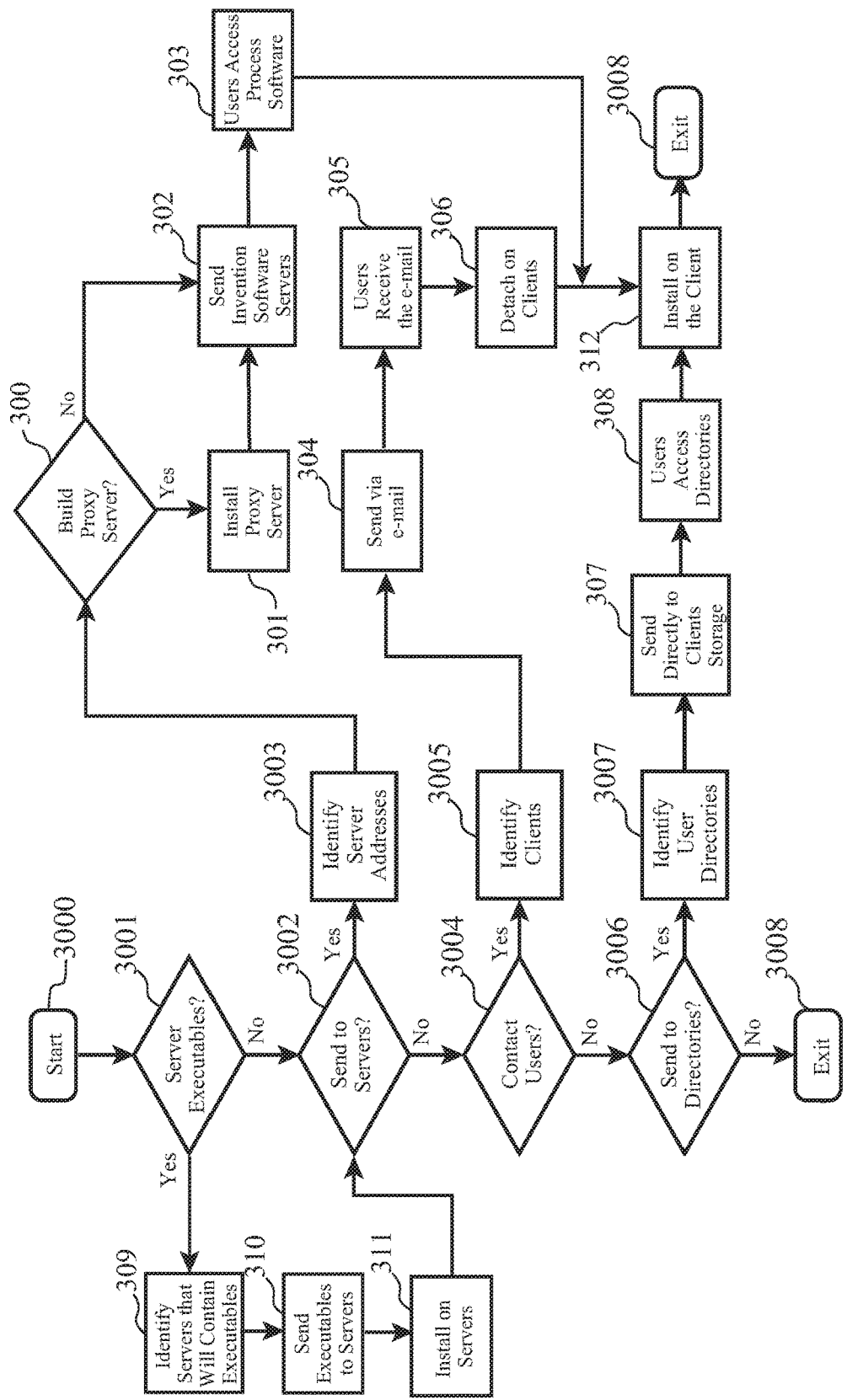
FIG. 3a sets forth a logical process to deploy software to a client in which the deployed software embodies the methods and processes of the present and related inventions.

Turning to FIG. 3a, the deployment process begins (3000) by determining (3001) if there are any programs that will reside on a server or servers when the process software is executed. If this is the case, then the servers that will contain the executables are identified (309). The process software for the server or servers is transferred directly to the server's storage via FTP or some other protocol or by copying through the use of a shared files system (310). The process software is then installed on the servers (311).

Next a determination is made on whether the process software is to be deployed by having users access the process software on a server or servers (3002). If the users are to access the process software on servers, then the server addresses that will store the process software are identified (3003).

In step (3004) a determination is made whether the process software is to be developed by sending the process software to users via e-mail. The set of users where the process software will be deployed are identified together with the addresses of the user client computers (3005). The process software is sent via e-mail to each of the user's client computers. The users then receive the e-mail (305) and then detach the process software from the e-mail to a directory on their client computers (306). The user executes the program that installs the process software on his client computer (312) then exits the process (3008).

A determination is made if a proxy server is to be built (300) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required then the proxy server is installed (301). The process software is sent to the servers either via a protocol such as FTP or it is copied directly from the source files to the server files via file sharing (302). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (303). Another embodiment is to have the servers automatically copy the process software to each client and then run the installation program for the process software at each client computer. The user executes the program that installs the process software on his client computer (312) then exits the process (3008).

Lastly, a determination is made on whether the process software will be sent directly to user directories on their client computers (3006). If so, the user directories are identified (3007). The process software is transferred directly to the user's client computer directory (307). This can be done in several ways such as, but not limited to, sharing of the file system directories and then copying from the sender's file system to the recipient user's file system or alternatively using a transfer protocol such as File Transfer Protocol ("FTP"). The users access the directories on their client file systems in preparation for installing the process software (308). The user executes the program that installs the process software on his client computer (312) then exits the process (3008).

Software Integration Embodiment. According to another embodiment of the present invention, software embodying the methods and processes disclosed herein are integrated as a service by a service provider to other software applications, applets, or computing systems.

Integration of the invention generally includes providing for the process software to coexist with applications, operating systems and network operating systems software and then installing the process software on the clients and servers in the environment where the process software will function.

Generally speaking, the first task is to identify any software on the clients and servers including the network operating system where the process software will be deployed that are required by the process software or that work in conjunction with the process software. This includes the network operating system that is software that enhances a basic operating system by adding networking features. Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 3B:
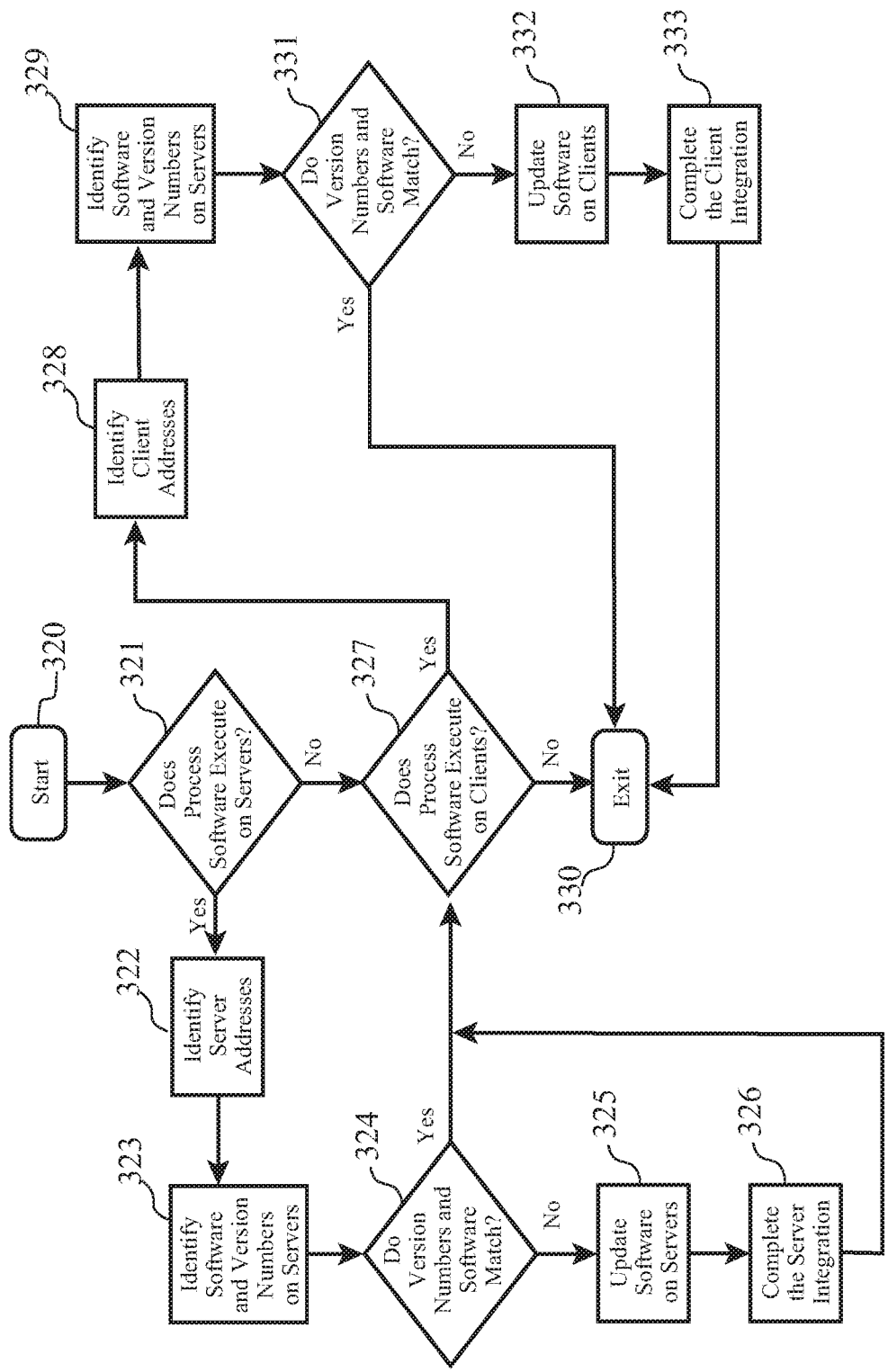
FIG. 3b sets forth a logical process to integrate software to other software programs in which the integrated software embodies the methods and processes of the present and related inventions.

Turning to FIG. 3b, details of the integration process according to the invention are shown. Integrating begins (320) by determining if there are any process software programs that will execute on a server or servers (321). If this is not the case, then integration proceeds to (327). If this is the case, then the server addresses are identified (322). The servers are checked to see if they contain software that includes the operating system ("OS"), applications, and network operating systems ("NOS"), together with their version numbers, that have been tested with the process software (323). The servers are also checked to determine if there is any missing software that is required by the process software (323).

A determination is made if the version numbers match the version numbers of OS, applications and NOS that have been tested with the process software (324). If all of the versions match, then processing continues (327). Otherwise, if one or more of the version numbers do not match, then the unmatched versions are updated on the server or servers with the correct versions (325). Additionally, if there is missing required software, then it is updated on the server or servers (325). The server integration is completed by installing the process software (326).

Step (327) which follows either (321), (324), or (326) determines if there are any programs of the process software that will execute on the clients. If no process software programs execute on the clients, the integration proceeds to (330) and exits. If this is not the case, then the client addresses are identified (328).

The clients are checked to see if they contain software that includes the operating system ("OS"), applications, and network operating systems ("NOS"), together with their version numbers, that have been tested with the process software (329). The clients are also checked to determine if there is any missing software that is required by the process software (329).

A determination is made if the version numbers match the version numbers of OS, applications and NOS that have been tested with the process software (331). If all of the versions match and there is no missing required software, then the integration proceeds to (330) and exits.

If one or more of the version numbers do not match, then the unmatched versions are updated on the clients with the correct versions (332). In addition, if there is missing required software then it is updated on the clients (332). The client integration is completed by installing the process software on the clients (333). The integration proceeds to (330) and exits.

Application Programming Interface Embodiment. In another embodiment, the invention may be realized as a service or functionality available to other systems and devices via an Application Programming Interface ("API"). One such embodiment is to provide the service to a client system from a server system as a web service.

On-Demand Computing Services Embodiment. According to another aspect of the present invention, the processes and methods disclosed herein are provided through an on demand computing architecture to render service to a client by a service provider.

Figure 3C:
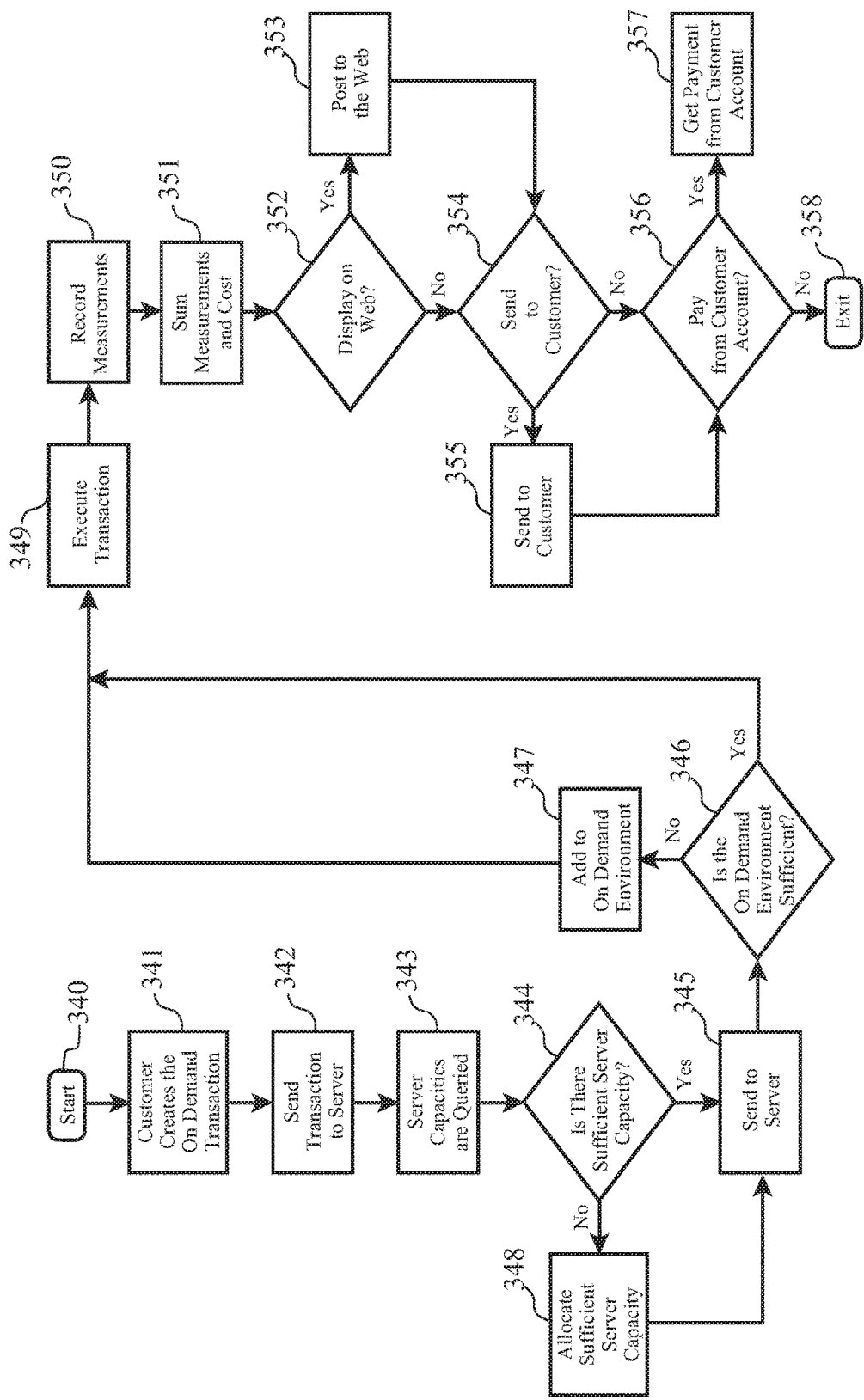
FIG. 3c sets forth a logical process to execute software on behalf of a client in an on-demand computing system, in which the executed software embodies the methods and processes of the present and related inventions.

Turning to FIG. 3c, generally speaking, the process software embodying the methods disclosed herein is shared, simultaneously serving multiple customers in a flexible, automated fashion. It is standardized, requiring little customization and it is scaleable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally, the assessed server may make requests of other servers that require CPU units. CPU units are an example that represents but one measurement of use. Other measurements of use include but are not limited to network bandwidth, memory usage, storage usage, packet transfers, complete transactions, etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to effect the performance of that server, other servers are accessed to increase the capacity and to share the workload. Likewise, when other measurements of use such as network bandwidth, memory usage, storage usage, etc. approach a capacity so as to effect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the computer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

FIG. 3c sets forth a detailed logical process which makes the present invention available to a client through an On-Demand process. A transaction is created that contains the unique customer identification, the requested service type and any service parameters that further specify the type of service (341). The transaction is then sent to the main server (342). In an On-Demand environment the main server can initially be the only server, then as capacity is consumed other servers are added to the On-Demand environment.

The server central processing unit ("CPU") capacities in the On-Demand environment are queried (343). The CPU requirement of the transaction is estimated, then the servers available CPU capacity in the On-Demand environment are compared to the transaction CPU requirement to see if there is sufficient CPU available capacity in any server to process the transaction (344). If there is not sufficient server CPU available capacity, then additional server CPU capacity is allocated to process the transaction (348). If there was already sufficient available CPU capacity, then the transaction is sent to a selected server (345).

Before executing the transaction, a check is made of the remaining On-Demand environment to determine if the environment has sufficient available capacity for processing the transaction. This environment capacity consists of such things as, but not limited to, network bandwidth, processor memory, storage etc. (345). If there is not sufficient available capacity, then capacity will be added to the On-Demand environment (347). Next, the required software to process the transaction is accessed, loaded into memory, then the transaction is executed (349).

The usage measurements are recorded (350). The usage measurements consists of the portions of those functions in the On-Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (351).

If the customer has requested that the On-Demand costs be posted to a web site (352), then they are posted (353). If the customer has requested that the On-Demand costs be sent via e-mail to a customer address (354), then they are sent (355). If the customer has requested that the On-Demand costs be paid directly from a customer account (356), then payment is received directly from the customer account (357). The last step is to exit the On-Demand process.

Grid or Parallel Processing Embodiment. According to another embodiment of the present invention, multiple computers are used to simultaneously process individual audio tracks, individual audio snippets, or a combination of both, to yield output with less delay. Such a parallel computing approach may be realized using multiple discrete systems (e.g. a plurality of servers, clients, or both), or may be realized as an internal multiprocessing task (e.g. a single system with parallel processing capabilities).

VPN Deployment Embodiment. According to another aspect of the present invention, the methods and processes described herein may be embodied in part or in entirety in software which can be deployed to third parties as part of a service, wherein a third party VPN service is offered as a secure deployment vehicle or wherein a VPN is build on-demand as required for a specific deployment.

A virtual private network ("VPN") is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider ("ESP") sets a network access server ("NAS") and provides the remote users with desktop client software for their computers. The telecommuters can then dial a toll-free number to attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over the network. The protocol of the outer packet is understood by the network and both points, called tunnel interfaces, where the packet enters and exits the network.

Figure 3D:
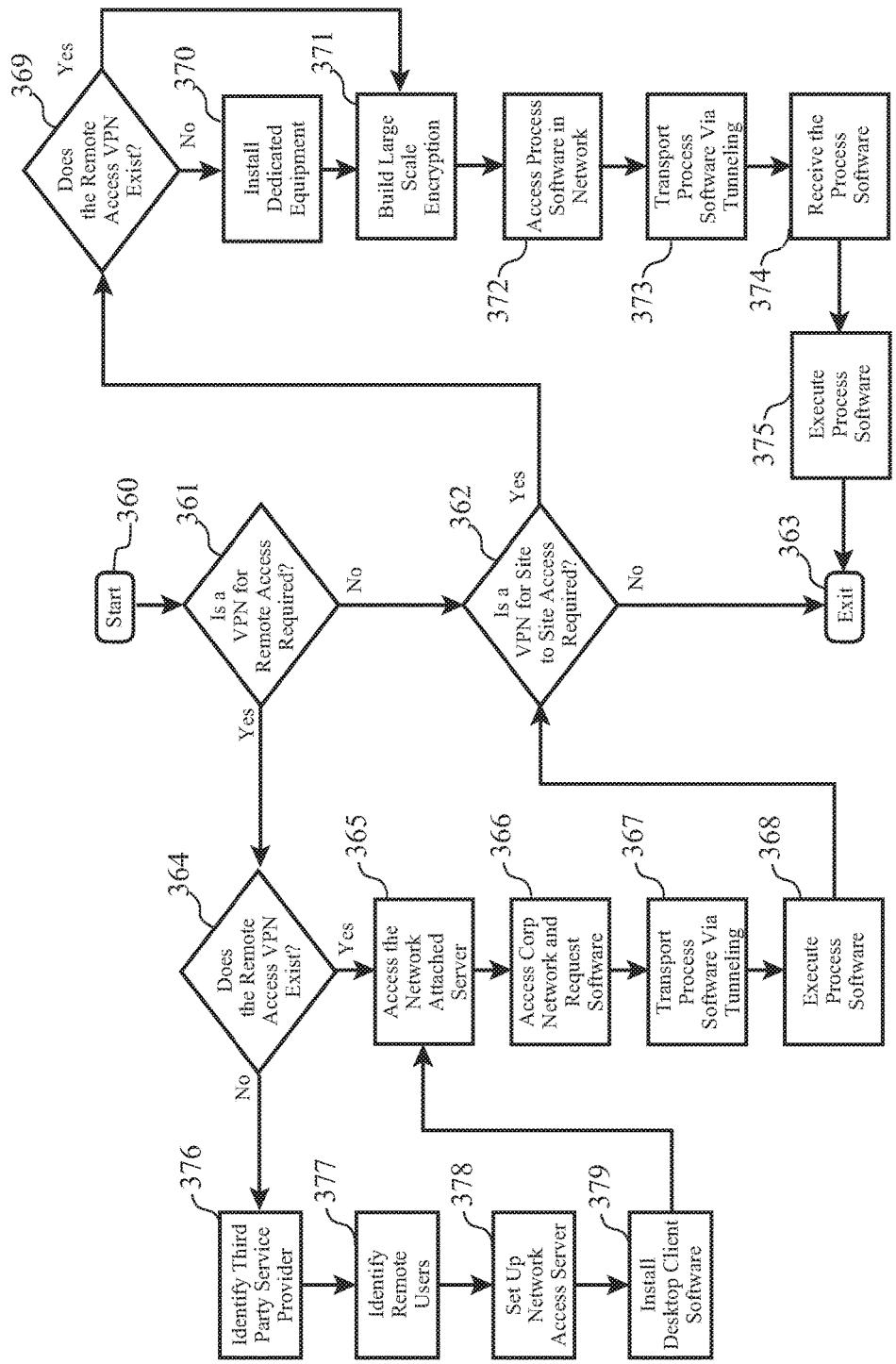
FIG. 3d sets forth a logical process to deploy software to a client via a virtual private network, in which the deployed software embodies the methods and processes of the present and related inventions.

Turning to FIG. 3d, VPN deployment process starts (360) by determining if a VPN for remote access is required (361). If it is not required, then proceed to (362). If it is required, then determine if the remote access VPN exits (364).

If a VPN does exist, then the VPN deployment process proceeds (365) to identify a third party provider that will provide the secure, encrypted connections between the company's private network and the company's remote users (376). The company's remote users are identified (377). The third party provider then sets up a network access server ("NAS") (378) that allows the remote users to dial a toll free number or attach directly via a broadband modem to access, download and install the desktop client software for the remote-access VPN (379).

After the remote access VPN has been built or if it has been previously installed, the remote users can access the process software by dialing into the NAS or attaching directly via a cable or DSL modem into the NAS (365). This allows entry into the corporate network where the process software is accessed (366). The process software is transported to the remote user's desktop over the network via tunneling. That is the process software is divided into packets and each packet including the data and protocol is placed within another packet (367). When the process software arrives at the remote user's desktop, it is removed from the packets, reconstituted and then is executed on the remote users desktop (368).

A determination is made to see if a VPN for site to site access is required (362). If it is not required, then proceed to exit the process (363). Otherwise, determine if the site to site VPN exists (369). If it does exist, then proceed to (372). Otherwise, install the dedicated equipment required to establish a site to site VPN (370). Then, build the large scale encryption into the VPN (371).

After the site to site VPN has been built or if it had been previously established, the users access the process software via the VPN (372). The process software is transported to the site users over the network via tunneling. That is the process software is divided into packets and each packet including the data and protocol is placed within another packet (374). When the process software arrives at the remote user's desktop, it is removed from the packets, reconstituted and is executed on the site users desktop (375). Proceed to exit the process (363).

CONCLUSION

While certain examples and details of a preferred embodiment have been disclosed, it will be recognized by those skilled in the art that variations in implementation such as use of different programming methodologies, computing platforms, and processing technologies, may be adopted without departing from the spirit and scope of the present invention. Therefore, the scope of the invention should be determined by the following claims.

What is claimed is:

1. A method for customizing a wait state experience for an attendee user represented by an attendee avatar in a virtual universe, the method comprising:
    during a default context of a virtual universe, detecting, by a server computer having a virtual world engine, that an attendee avatar is entering a wait state for a virtual world event, wherein the default context comprises a virtual meeting room or virtual class room having a virtual presentation screen and a presenter avatar;
    inferring, by the virtual world engine of the server computer, one or more wait state context preferences for an attendee user which are not explicitly established by the attendee user, the inferring including artificial intelligence analysis of one or more items selected from the group consisting of the content of an attendee user inventory, one or more past conversations in the virtual universe default context by the attendee user, an appearance factor of the avatar representing the attendee user, and a friend list for the attendee user in the default context of the virtual universe;
    selecting, by the virtual world engine of the server computer, at least one game content object according to the one or more wait state context preferences;
    creating, by the virtual world engine of the server computer, a wait state context in the virtual universe containing the at least one game content object;
    transporting, by the virtual world engine of the server computer, the attendee avatar to the wait state context and allowing the attendee user to interact with the at least one game content object; and
    returning, by the virtual world engine of the server computer, the attendee avatar to the default context responsive to the virtual world event starting or occurring.

2. The method as set forth in claim 1 wherein the inferring one or more wait state context preferences further comprises accessing, by the virtual world engine of the server computer, a stored preference profile.

3. The method as set forth in claim 1 wherein the inferring further comprises artificial intelligence analysis of past waiting room preferences for the attendee user.

4. The method as set forth in claim 1 wherein the event comprises reaching an end of a queue for a service by the attendee avatar.

5. The method as set forth in claim 4 wherein the service comprises conferencing the attendee avatar to at least one avatar representing one or more facilitator users selected from the group consisting of a customer service representative, an educator, a trainer, and a business person.

6. The method as set forth in claim 5 further comprising providing, by the virtual world engine of the server computer, to the customer service representative, one or more information objects regarding activities of the attendee user during the wait state context.

7. The method as set forth in claim 1 further comprising depositing, by the virtual world engine of the server computer, a reward object into a attendee user inventory responsive to returning the attendee avatar to the default context.

8. The method as set forth in claim 1 further comprising advancing, by the virtual world engine of the server computer, a position of the attendee avatar within a queue responsive to completion of a game or challenge, wherein the event comprises reaching an end of the queue.

9. The method as set forth in claim 1 wherein the selecting further comprises selecting at least one environment and scenery object, and wherein the creating includes the selected environment or scenery object.

10. The method as set forth in claim 1 wherein the selecting further comprises selecting an information stream object, and wherein the creating includes the information stream object.

11. The method as set forth in claim 1 wherein the selecting further comprises selecting a challenge object, and wherein the creating includes the selected challenge object.

12. The method as set forth in claim 1 wherein the selecting further comprises selecting a reward object deposited to an attendee user inventory.

13. The method as set forth in claim 12 wherein the event comprises the attendee avatar being in the wait state context for a predetermined period of time.

14. The method as set forth in claim 13 wherein the event comprises completion of a game or challenge object.

15. A computer program product for customizing a wait state experience for an attendee user represented by an attendee avatar in a virtual universe, comprising:
    a tangible, computer-readable computer memory which is not a propagating signal per se;
    one or more program instructions encoded by the computer memory, for causing a virtual world engine of a computer server to, when executed, perform steps comprising:
        during a default context of a virtual universe, detecting that an attendee avatar is entering a wait state for a virtual world event, wherein the default context comprises a virtual meeting room or virtual class room having a virtual presentation screen and a presenter avatar;

inferring one or more wait state context preferences for an attendee user which are not explicitly established by the attendee user, the inferring including artificial intelligence analysis of one or more items selected from the group consisting of the content of an attendee user inventory, one or more past conversations in the virtual universe default context by the attendee user, an appearance factor of the avatar representing the attendee user, and a friend list for the attendee user in the default context of the virtual universe;

selecting at least one game content object according to the one or more wait state context preferences;

creating a wait state context in the virtual universe containing the at least one game content object;

transporting the attendee avatar to the wait state context and allowing the attendee user to interact with the at least one game content object; and returning the attendee avatar to the default context responsive to the virtual world event starting or occurring.

16. The computer program product as set forth in claim 15 wherein the event comprises reaching an end of a queue for a service by the attendee avatar, and wherein the service comprises conferencing the attendee avatar to at least one avatar representing one or more facilitator users selected from the group consisting of a customer service representative, an educator, a trainer, and a business representative person.

17. A system for customizing a wait state experience for an attendee user represented by an attendee avatar in a virtual universe, comprising:

a computer server having a processor and a virtual world engine;

a tangible, computer-readable computer memory which is not a propagating signal per se;

one or more program instructions encoded by the computer memory, for causing the virtual world engine of the computer server to, when executed, perform steps comprising:

during a default context of a virtual universe, detecting that an attendee avatar is entering a wait state for a virtual world event, wherein the default context comprises a virtual meeting room or virtual class room having a virtual presentation screen and a presenter avatar;

inferring one or more wait state context preferences for an attendee user which are not explicitly established by the attendee user, the inferring including artificial intelligence analysis of one or more items selected from the group consisting of the content of an attendee user inventory, one or more past conversations in the virtual universe default context by the attendee user, an appearance factor of the avatar representing the attendee user, and a friend list for the attendee user in the default context of the virtual universe;

selecting at least one game content object according to the one or more wait state context preferences;

creating a wait state context in the virtual universe containing the at least one game content object;

transporting the attendee avatar to the wait state context and allowing the attendee user to interact with the at least one game content object; and returning the attendee avatar to the default context responsive to the virtual world event starting or occurring.

18. The system as set forth in claim 17 wherein the event comprises reaching an end of a queue for a service by the attendee avatar, and wherein the service comprises conferencing the attendee avatar to at least one avatar representing one or more facilitator users selected from the group consisting of a customer service representative, an educator, a trainer, and a business representative person.

* * * * *